United States Patent
Song et al.

(10) Patent No.: US 9,742,516 B2
(45) Date of Patent: Aug. 22, 2017

(54) METHOD AND SYSTEM FOR CONTROL FORMAT DETECTION IN HETEROGENEOUS CELLULAR NETWORKS

(75) Inventors: Yi Song, Plano, TX (US); Chandra Sekhar Bontu, Nepean (CA); Youn Hyoung Heo, Kitchenar (CA); Yufei Wu Blankenship, Kildeer, IL (US); Yi Yu, Irving, TX (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 260 days.

(21) Appl. No.: 13/193,023

(22) Filed: Jul. 28, 2011

(65) Prior Publication Data

US 2013/0028199 A1    Jan. 31, 2013

(51) Int. Cl.

| | |
|---|---|
| H04W 28/26 | (2009.01) |
| H04L 27/26 | (2006.01) |
| H04L 5/26 | (2006.01) |
| H04W 72/04 | (2009.01) |
| H03M 13/00 | (2006.01) |
| H04J 11/00 | (2006.01) |

(Continued)

(52) U.S. Cl.
CPC ....... *H04J 11/0059* (2013.01); *H04J 11/0056* (2013.01); *H04L 5/0053* (2013.01); *H04L 5/0073* (2013.01); *H04W 16/12* (2013.01); *H04J 2211/001* (2013.01); *H04W 48/02* (2013.01); *H04W 84/045* (2013.01)

(58) Field of Classification Search
CPC ... H04W 72/04; H04W 84/045; H04W 48/02; H04W 72/0453; H04W 16/12; H04L 27/28; H04L 1/0041; H04L 1/0072; H04L 5/0007; H04L 41/0053

USPC .......... 370/328, 329, 280, 281, 225, 252; 455/509, 525, 436, 67.13; 714/714, 748; 375/267

See application file for complete search history.

(56) References Cited

U.S. PATENT DOCUMENTS 6,792,284 B1 * 9/2004 Dalsgaard et al. ........... 455/525
2008/0084853 A1 * 4/2008 Kuchibhotla et al. ........ 370/338
(Continued)

FOREIGN PATENT DOCUMENTS

CN    101523947    9/2009

OTHER PUBLICATIONS

3GPP TS 36.211 v10.1.0 (Mar. 2011), Evolved Universal Terrestrial Radio Access (E-UTRA), Physical Channels and Modulation (Release 10); 103 pages.

(Continued)

*Primary Examiner* — Alpus H Hsu
*Assistant Examiner* — Camquyen Thai
(74) *Attorney, Agent, or Firm* — Fish & Richardson P.C.

(57) ABSTRACT

A user equipment having a first mechanism to obtain a control region size of a sub-frame of a cell, the user equipment having a processor; and a communications subsystem, wherein the processor and communications subsystem are configured to cooperate to: determine having a first mechanism to obtain a control region size of a sub-frame of the first cell, second cell, or both, whether the user equipment is within an area of the second cell; and utilize, a second mechanism to obtain a control region size of a sub-frame of the second cell while the user equipment is within the area of the second cell.

6 Claims, 26 Drawing Sheets

(51) Int. Cl.

| | |
|---|---|
| H04W 16/12 | (2009.01) |
| H04L 5/00 | (2006.01) |
| H04W 84/04 | (2009.01) |
| H04W 48/02 | (2009.01) |

(56) References Cited

U.S. PATENT DOCUMENTS

| | | | |
|---|---|---|---|
| 2009/0147743 A1* | 6/2009 | Parkvall et al. | 370/329 |
| 2009/0161618 A1* | 6/2009 | Johansson | H04W 72/0446 370/329 |
| 2009/0238131 A1* | 9/2009 | Montojo et al. | 370/329 |
| 2009/0259909 A1* | 10/2009 | Luo | 714/748 |
| 2009/0262856 A1* | 10/2009 | Onggosanusi et al. | 375/267 |
| 2010/0008317 A1* | 1/2010 | Bhattad | H04L 1/0003 370/329 |
| 2010/0110901 A1 | 5/2010 | Wong et al. | |
| 2010/0120442 A1* | 5/2010 | Zhuang et al. | 455/450 |
| 2010/0182903 A1* | 7/2010 | Palanki | H04L 1/0041 370/225 |
| 2010/0210268 A1 | 8/2010 | Lim | |
| 2010/0246455 A1* | 9/2010 | Nangia et al. | 370/280 |
| 2010/0322154 A1* | 12/2010 | Chen et al. | 370/328 |
| 2011/0026645 A1* | 2/2011 | Luo et al. | 375/340 |
| 2011/0044259 A1* | 2/2011 | Nimbalker et al. | 370/329 |
| 2011/0103338 A1* | 5/2011 | Astely et al. | 370/329 |
| 2011/0170499 A1* | 7/2011 | Nayeb Nazar | H04L 1/1812 370/329 |
| 2011/0237270 A1* | 9/2011 | Noh et al. | 455/450 |
| 2011/0255486 A1* | 10/2011 | Luo et al. | 370/329 |
| 2011/0261769 A1* | 10/2011 | Ji et al. | 370/329 |
| 2011/0268032 A1* | 11/2011 | Kim et al. | 370/328 |
| 2011/0269492 A1* | 11/2011 | Wang | H04L 5/003 455/509 |
| 2011/0275394 A1* | 11/2011 | Song et al. | 455/509 |
| 2012/0033650 A1* | 2/2012 | Ahn et al. | 370/336 |
| 2012/0082101 A1* | 4/2012 | Gaal et al. | 370/329 |
| 2012/0088516 A1* | 4/2012 | Ji et al. | 455/452.1 |
| 2012/0220327 A1* | 8/2012 | Lee et al. | 455/509 |

OTHER PUBLICATIONS

3GPP TS 36.212 v10.1.0 (Mar. 2011), Evolved Universal Terrestrial Radio Access (E-UTRA), Multiplexing and channel coding (Release 10); 76 pages.

3GPP TS 36.213 v10.1.0 (Mar. 2011), Evolved Universal Terrestrial Radio Access (E-UTRA), Physical layer procedures (Release 10); 115 pages.

3GPP TS 36.331 v10.1.0 (Mar. 2011), Evolved Universal Terrestrial Radio Access (E-UTRA), Radio Resource Control (RRC), Protocol Specification (Release 10); 290 pages.

NTT DoCoMo; "Investigation on CRS Interference Transmitted to Downlink Control Channel"; 3GPP TSG RAN WG1 Meeting #61 (R1-104036); Dresden, Germany; Jun. 28-Jul. 2, 2010; 5 pages.

Qualcomm Incorp.; "Enabling Communication in Harsh Interference Scenarios"; 3GPP TSG-RAN WG1 Meeting #61bis (R1-103560); Dresden, Germany; Jun. 28-Jul. 2, 2010; 11 pages.

Huawei; "Analysis of PCFICH Performance Issue and Possible Solutions"; 3GPP TSG RAN WG1 Meeting #63 (R1-106166); Jacksonville, USA; Nov. 15-19, 2010; 6 pages.

Samsung; "Discussion on PCFICH Issue in Range Expansion"; 3GPP TSG RAN WG1 Meeting #63 (R1-106048); Jacksonville, USA; Nov. 15-19, 2010; 5 pages.

LG Electronics; "Impact of CRS Interference"; 3GPP TSG RAN WG1 Meeting #63 (R1-106144); Jacksonville, USA; Nov. 15-19, 2010; 8 pages.

ZTE; "Discussion on CRS Interference and CSI Measurements in Macro-Pico Deployment"; 3GPP TSG RAN WG1 Meeting #63 (R1-105969); Jacksonville, USA; Nov. 15-19, 2010; 4 pages.

Ericsson et al., "Remaining details for CA based HetNet in Rel-10", R1-111323, 3GPP TSg-RAN WG1 #65, Barcelona, Spain, May 9-13, 2011.

Qualcomm Incorporated, "Enabling communication in hash interference scenarios", R1-105693, 3GPP TSG-RAN WG1 #62bis, Oct. 11-15, 2010.

Samsung, "Discussion on PCFICH issue in Range expansion", R1-105405, 3GPP TSG RAN WG1 #62, Madris, Spain, Aug. 23-28, 2010.

International Search Report and Written Opinion of the International Searching Authority issued in international application No. PCT/US2012/041681 dated Feb. 14, 2013; 13 pages.

International Preliminary Report on Patentability under Chapter I issued in International Application No. PCT/US2012/041681 on Feb. 4, 2014; 9 pages.

European Patent Office, Partial European Search Report, Application No. PCT/US2012/041681, Feb. 12, 2015.

NTT DOCOMO: "PCFICH Protection by Indicating MBSFN Subframe Configuration in Handover Command", 3GPP Draft; R2-110114 EICIC PCFICH Protection, 3rd Generation Partnership Project, Mobile Competence Centre; France, vol. RAN WG2, no. Dublin Ireland; Jan. 11, 2001, XP050492899.

Extended European Search Report issued in EP Application No. 12817164.2 on Jun. 29, 2015; 12 pages.

NTT DOCOMO; "Protection by Indicating MBSFN Subframe Configuration in Handover Command"; 3GPP TSG RAN WG2 Meeting #72bis; R2-110114; Dublin, Ireland, Jan. 17-21, 2011; 5 pages.

Office Action issued in Canadian Application No. 2,842,154 on Apr. 24, 2015; 4 pages.

Office Action issued in Chinese Application No. 201280043733.2 on Apr. 12, 2016; 5 pages.

Office Action issued in Canadian Application No. 2,842,154 on Apr. 5, 2016; 4 pages.

Office Action issued in Chinese Application No. 201280043733.2 on Dec. 16, 2016; 13 pages.

Office Action issued in Taiwanese Application No. 101125000 on Dec. 5, 2016; 7 pages.

Office Action issued in Canadian Application No. 2,842,154 on Jan. 20, 2017; 5 pages.

Communication Pursuant to Article 94(3) EPC issued in EP Application No. 12817164.2 on Mar. 21, 2017; 6 pages.

Office Action issued in Chinese Application No. 201280043733.2 dated Jul. 4, 2017; 3 pages.

\* cited by examiner

METHOD AND SYSTEM FOR CONTROL FORMAT DETECTION IN HETEROGENEOUS CELLULAR NETWORKS

FIELD OF THE DISCLOSURE

The present disclosure relates to enhanced inter-cell interference coordination in a mobile network and in particular relates to communication between a user equipment and a weaker cell.

BACKGROUND

Heterogeneous deployment has been considered by, the Third Generation Partnership Project (3GPP) Long-Term Evolution-Advanced (LTE-A) working groups as a technique to substantially improve system capacity and coverage. In a heterogeneous deployment, low power network nodes such as pico evolved Node-Bs (eNBs) and femto eNBs are overlaid with traditional high power eNBs which can be referred to as a macro eNBs. Such macro, pico, and femto eNBs form macro, pico, and femto cells, respectively. The term "cell" refers to an area of coverage of wireless transmission by a network, such as an eNB. In some instances, each of pico cells or femto cells can have a coverage at least partially overlapping with the coverage of the macro cell. To efficiently utilize the radio spectrum, in one embodiment macro, pico and femto cells are deployed on the same carrier. However, full frequency reuse among pico, femto and macro cells could introduce severe inter-cell interference.

In particular, to improve the system capacity, range expansion has been introduced for pico eNBs where a user equipment (UE) could connect to the pico eNB even when the signal from the macro eNB is stronger. Similarly, in closed subscriber group (CSG) femto cells, the UE may receive a stronger signal from the femto cell than from the macro eNB. However, if the UE is not part of the closed subscriber group, the UE may need to connect to the macro eNB. The weaker cell that the UE is connecting to is referred to herein as the victim cell. In such an instance, the stronger cell that the UE is not connecting to can be referred to as the aggressor cell in the context of this document.

One solution to reduce interference in a victim cell is almost blank sub-frame (ABS) based enhanced inter-cell interference coordination (eICIC). In this solution, the higher powered cell blanks out transmission or lowers transmitting power on certain sub-frames to allow signaling from the lower powered (victim) cell. However, the almost blank sub-frame still contains cell-specific reference signals (CRS), which are sent during the ABS, causing degraded reception for various control and data channels, including the Physical Control Format Indicator Channel (PCFICH), the Physical Hybrid Automatic Repeat Request (HARQ) Indicator Channel (PHICH) the Physical Downlink Control Channel (PDCCH) and the Physical Downlink Shared Channel (PDSCH). However, the PHICH, PDCCH and PDSCH can utilize multiple orthogonal frequency divisional multiplexing (OFDM) symbols and can thus be transmitted beyond the CRS-polluted OFDM symbols. Conversely, the PCFICH cannot be reliably detected under the CRS interference since the PCFICH is transmitted in the first OFDM symbol only and thus experiences significant interference from CRS.

BRIEF DESCRIPTION OF THE DRAWINGS

The present disclosure will be better understood with reference to the drawings in which.

DETAILED DESCRIPTION

Figure 1:
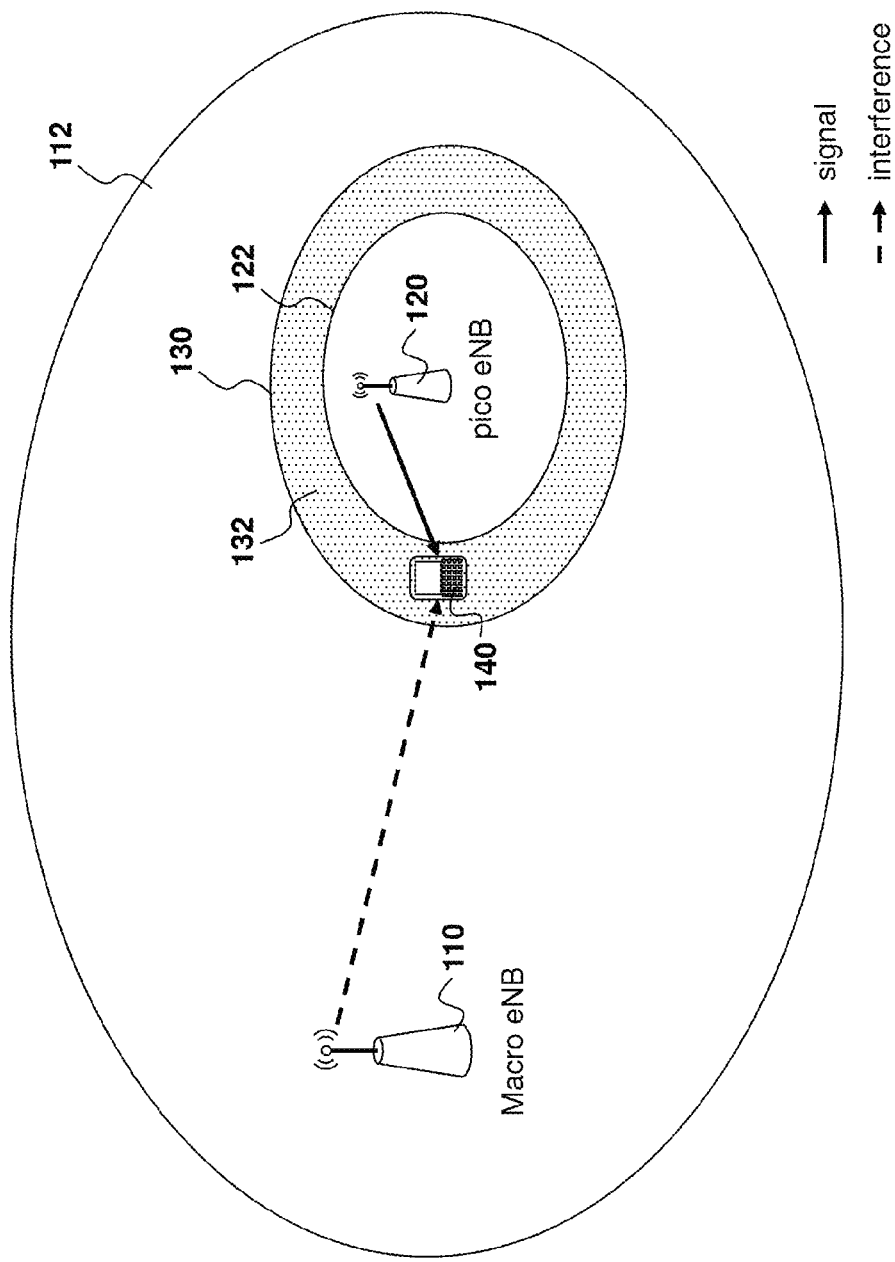
FIG. 1 is a block diagram showing a heterogeneous network with a pico cell and macro cell, the pico cell having a range expansion area.

The present disclosure provides a method for a user equipment in a network including a first cell and a second cell, the second cell having a range at least partially overlapping with a range of the first cell, the method comprising: determining, by the user equipment having a first mechanism to obtain a control region size of a sub-frame of the first cell, second cell, or both, whether the user equipment is within an area of the second cell; and utilizing, by the user equipment, a second mechanism to obtain a control region size of a sub-frame of the second cell while the user equipment is within the area of the second cell.

The present disclosure further provides a user equipment having a first mechanism to obtain a control region size of a sub-frame of a cell, the user equipment comprising: a processor; and a communications subsystem, wherein the processor and communications subsystem are configured to cooperate to: determining, by the user equipment having a first mechanism to obtain a control region size of a sub-frame of the first cell, second cell, or both, whether the user equipment is within an area of the second cell; and utilizing, by the user equipment, a second mechanism to obtain a control region size of a sub-frame of the second cell while the user equipment is within the area of the second cell.

The present disclosure further provides a method at a first network element having an area at least partially overlapping with an area of a second network element, the method comprising: signaling to a user equipment when the user equipment enters or leaves the overlapping area; and setting a control region size for at least a subset of subframes sent from the first network element to comply with a secondary mechanism.

The present disclosure still further provides a network element operating in an area at least partially overlapping with another network element, the network element comprising: a processor; and a communications subsystem, wherein the processor and communications subsystem cooperate to: signal to a user equipment when the user equipment enters or leaves the overlapping area; and set a control region size for at least a subset of subframes sent from the network element to comply with a secondary mechanism.

The present disclosure further provides a method at an user equipment comprising: calculating a sequence of first metrics and a sequence of second metrics at a receiver of the user equipment for a control format indicator, wherein the sequence of first metrics corresponds with a first set of resource elements, and wherein the sequence of second metrics corresponds with a second set of resource elements; determining a sequence of third metrics, the sequence of third metrics being a function of the sequence of first metrics and the sequence of second metrics; and if a lowest third metric from the sequence of third metrics is lower than a threshold, choosing a control format indicator corresponding with the lowest third metric.

The present disclosure further provides a user equipment comprising: a processor; and a communications subsystem, wherein the processor and communications subsystem are configured to cooperate to: calculate a sequence of first metrics and a sequence of second metrics at a receiver of the user equipment for a control format indicator, wherein the sequence of first metrics corresponds with a first set of resource elements, and wherein the sequence of second metrics corresponds with a second set of resource elements; determine a sequence of third metrics, the sequence of third metrics being a function of the sequence of first metrics and the sequence of second metrics; and if a lowest third metric from the sequence of third metrics is lower than a threshold, choose a control format indicator corresponding with the lowest third metric.

The present disclosure further provides a method at a network element comprising: receiving a configured ABS sub-frame pattern from the neighboring network nodes; determining a composite folded ABS pattern based on the received ABS sub-frame patterns; and transmitting the composite folded ABS sub-frame pattern.

The present disclosure further provides a network element comprising: a processor; and a communications subsystem, wherein the processor and communications subsystem are configured to cooperate to: receive a configured ABS sub-frame pattern from the neighboring network nodes; determine a composite folded ABS pattern based on the received ABS sub-frame patterns; and transmit the composite folded ABS sub-frame pattern.

The present disclosure further provides a method for receiving a control region size of a subframe at a user equipment comprising: obtaining, by the user equipment, a second control format indicator on a resource other than a PCFICH, wherein the resource carrying the second control format indicator is a part of the sub-frame.

The present disclosure further provides a user equipment comprising: a processor; and a communications subsystem, wherein the processor and communications subsystem are configured to cooperate to: obtain a second control format indicator on a resource other than the PCFICH, wherein the second control format indicator provides information on the control region size of a sub-frame, and wherein the resource used to carry the second control format indicator is part of the sub-frame.

The present disclosure further provides a method at a network element comprising: transmitting or receiving a configured ABS subframe pattern to or from the neighboring network nodes; and transmitting a secondary CFI over predetermined subframes.

The present disclosure is described below with regard to the 3GPP LTE-A standards, and in some embodiments to Release 11 of the 3GPP LTE-A standards. However, the present disclosure is not limited to this standard, and all could be applied to all versions of the LTE standards and to other similar radio technologies.

In 3GPP LTE-A, heterogeneous deployment has been considered to improve system capacity and coverage. In heterogeneous deployment, low transmit power network nodes such as pico eNBs and femto eNBs are placed within traditional high transmit power macro cells. Further, for pico eNBs, range expansion (RE) can be used to offload traffic from the macro to the pico. Reference is now made to FIG. 1.

In FIG. 1, a macro eNB 110 has a coverage area shown by reference numeral 112. In order to offload UEs from macro eNB 110, a pico eNB 120 may be introduced within area 112. Pico eNB has a coverage area shown by reference numeral 122.

In order to offload more UEs to the pico eNB 120, range expansion can be utilized to increase the serving area of pico eNB 120 from area 122 to the area shown by reference numeral 130. In the range expansion area 132 between reference numerals 130 and 122, the UE 140 communicates with the pico eNB 120 even if the signal from macro eNB 110 is stronger. While this offloads more UEs to the pico than when range expansion is not used, the UE in the range expansion area connected to pico eNB 120 may see significant interference form macro eNB 110.

Figure 2:
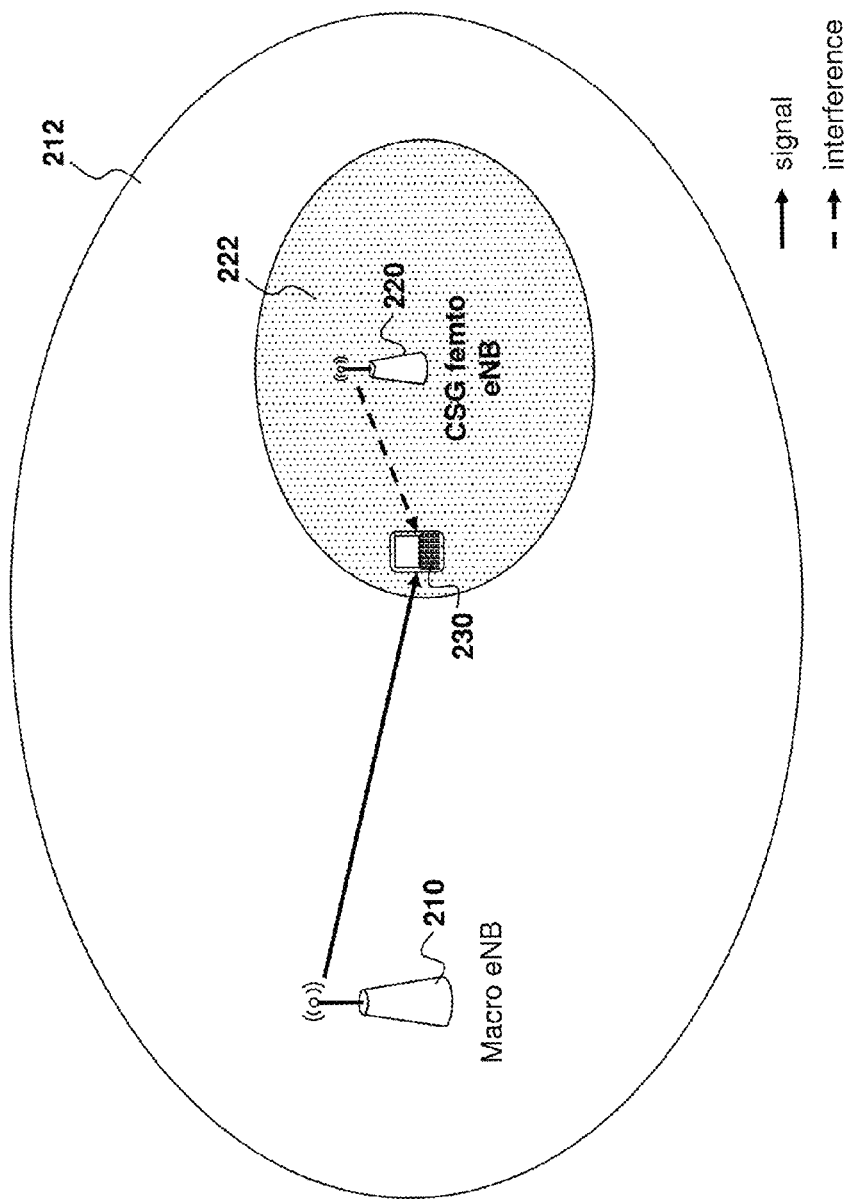
FIG. 2 is a block diagram showing a heterogeneous network with a closed subscriber group femto cell and a macro cell.

Similarly, interference conditions can exist for femto cells with closed subscriber group (CSG) access. Reference is now made to FIG. 2.

In FIG. 2, macro eNB 210 serves an area shown by reference numeral 212. A CSG femto eNB 220 serves an area shown by reference numeral 222. However, the CSG femto cell is a closed group and only allows communication from designated or member UEs. If a non-member UE 230 is within area 222, that non-member 230 still needs to be serviced by macro eNB 210. The non-member UE 230 would however see significant interference from the femto eNB 220.

Figure 3:
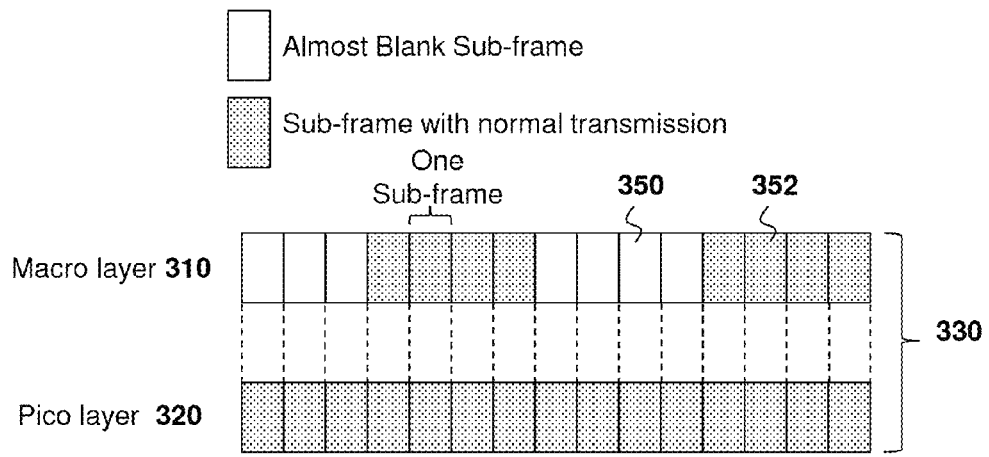
FIG. 3 is a timing diagram showing transmissions of almost blank sub frames in a pico-macro embodiment.
Figure 4:
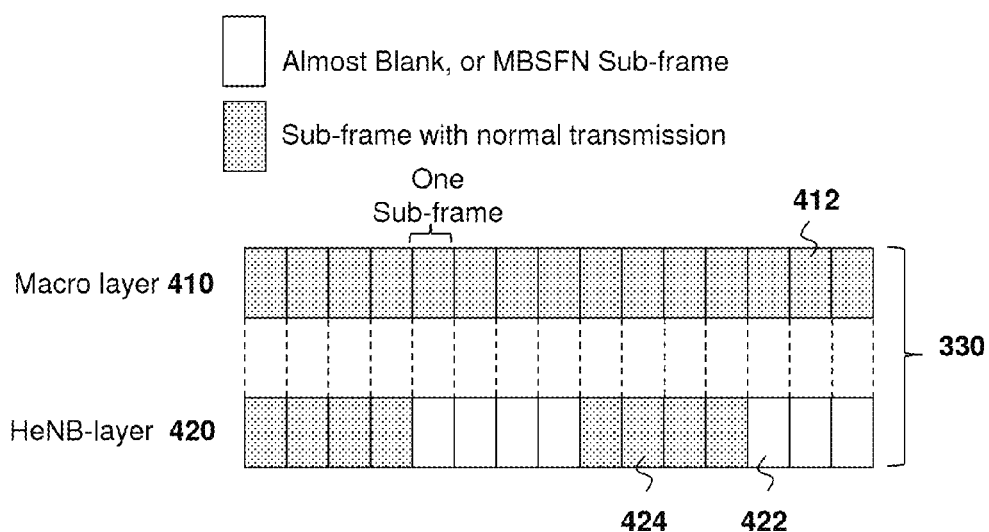
FIG. 4 is a timing diagram showing transmissions of almost blank sub frames in a femto-macro embodiment.

In order to overcome interference issues with such heterogeneous deployment, almost blank sub-frame (ABS) based enhanced inter-cell interference coordination (eICIC) schemes have been adopted in Release 10 of the LTE standards to solve the interference issues. Reference is now made to FIGS. 3 and 4, where FIG. 3 shows the ABS' deployment for the embodiment of FIG. 1 while FIG. 4 shows the ABS deployment for the embodiment of FIG. 2.

As shown in FIGS. 3 and 4, the ABS sub-frames are configured on the aggressor cell. In particular, referring to FIG. 3, in the pico cell RE case, the interfering signal comes from the macro eNB and thus the ABS is configured on the macro eNB. Similarly, for the femto case of FIG. 4, the interference comes from the femto cell and thus ABS is configured on the femto eNB.

During an ABS, the aggressor cell blanks the transmissions of control and data or transmit with significantly reduced power. However, during an ABS the aggressor cell may have some transmissions for essential signals, as explained below. ABS provides interference free or almost interference free resources to victim cells so that pico UEs in the RE areas or victim macro UEs in the femto coverage areas can be scheduled to communicate with their serving nodes.

Thus, in particular, referring to FIG. 3 a macro eNB 310 and pico eNB 320 communicate over sub-frames generally designated as 330. Pico eNB 320 utilizes sub-frames with normal transmission whereas the macro eNB 310 intersperses almost blank sub-frames 350 within normal transmission sub-frames 352.

Similarly, for FIG. 4, macro eNB 410 transmits sub-frames with normal transmissions as shown by reference numeral 412. Femto eNB 420 transmits almost blank or Multicast/Broadcast over Single Frequency Network (MB-SFN) sub-frames 422 interspersed among the sub-frames with normal transmission 424.

As indicated above, however, the almost blank sub-frames are not completely blank and include some signaling. For example, if the primary synchronization sequence (PSS), the secondary synchronization sequence (SSS), physical broadcast channel (PBCH), system information block 1 (SIB1), paging, or positioning reference signal (PRS) coincide with an almost blank sub-frame, they are transmitted in the almost blank sub-frame. Further, the associated Physical Downlink Control Channel (PDCCH) is transmitted when SIB1 or paging is transmitted.

The cell-specific reference signal (CRS) is also transmitted on ABS to avoid impacts to Release 8 or 9 LTE standard UE channel estimation and radio resource management (RRM), radio link management (RLM) and channel quality indicator measurements for these UEs. To further reduce the interference from CRS in the data region, an ABS could be configured as an MBSFN sub-frame wherever possible. However, for frequency division duplex (FDD), sub-frame numbers 0, 4, 5 and 9 cannot be MBSFN sub-frames due to PSS/SSS/PBCH/SIB1/paging. Similarly, sub-frames 0, 1, 2, 5 and 6 cannot be MBSFN sub-frames in time division duplex (TDD).

Control Region Size

In LTE, each of frames includes a plurality of sub-frames (for example, 10 sub-frames). The first few OFDM symbols of each sub-frame can be used to transmit the PDCCH. A number of OFDM symbols are allocated for PDCCH, and this number may vary by sub-frame. Such a number of OFDM symbols allocated for PDCCH can be referred to as a "control size" of a sub-frame.

As shown in Table 1 below, the possible number of OFDM symbols for PDCCH depends on the system bandwidth and sub-frame type. For example, in case the system bandwidth is larger than 10 resource blocks (RBs), and on non-MBSFN FDD sub-frames, the PDCCH could occupy 1, 2 or 3 OFDM symbols.

To allow the UE to correctly decode the PDCCH, the physical control format indicator channel (PCFICH) is transmitted to indicate the control region size of the sub-frame. PCFICH is transmitted in four resource element groups (REGs) distributed over the entire bandwidth of the first OFDM symbol of the sub-frame. The Control Format Indicator (CFI) takes values of CFI=1, 2 or 3. For system bandwidths of more than ten resource blocks ($N_{RB}^{DL}$), the control region size in units of OFDM symbols is 1, 2 or 3 and is given by the CFI. For system bandwidths of less than ten resource blocks ($N_{RB}^{DL}$), the control region size in units of OFDM symbols is 2, 3 or 4 and is given by CFI+1.

TABLE 1

Number of OFDM Symbols Used for PDCCH

| Subframe | Number of OFDM symbols for PDCCH when $N_{RB}^{DL} > 10$ | Number of OFDM symbols for PDCCH when $N_{RB}^{DL} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

Figure 5:
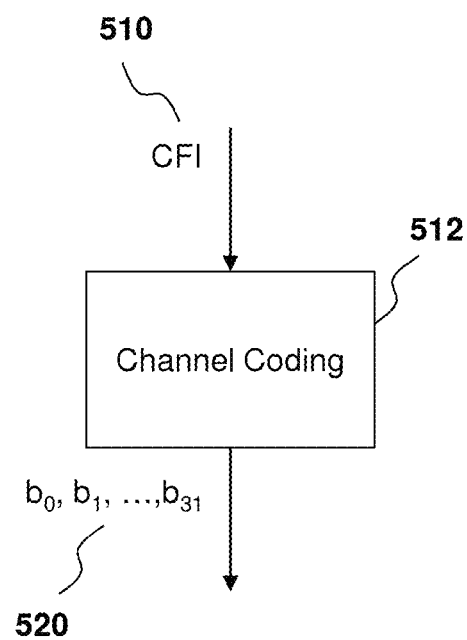
FIG. 5 is a block diagram showing CFI channel coding.

Reference is now made to FIG. 5, which shows the coding flow of a PCFICH. In particular, the control format indicator 510 is provided to channel coding block 512 and, as a result of channel coding block 512, 32 bits, designated as $b_0$ to $b_{31}$ are output as shown by reference 520.

The output bits 520 are coded according to Table 2 below.

TABLE 2

CFI code words

| CFI | CFI code word $<b_0, b_1, \ldots, b_{31}>$ |
| --- | --- |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |

TABLE 2-continued

CFI code words

| CFI | CFI code word <$b_0, b_1, \ldots, b_{31}$> |
|---|---|
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The coded 32 bits from Table 2 above are modulated with quadrature phase shift keying (QPSK) and 16 symbols are created and are mapped to four resource element groups (REGs). Each REG includes four resource elements.

In some cases, the CFI value can be implicitly indicated by the PHICH duration. The PHICH duration is configurable by higher layers according to Table 3 below.

TABLE 3

PHICH duration in MBSFN and non-MBSFN sub-frames

| | Non-MBSFN subframes | | MBSFN subframes |
|---|---|---|---|
| PHICH duration | Subframes 1 and 6 in case of frame structure type 2 | All other cases | on a carrier supporting PDSCH |
| Normal | 1 | 1 | 1 |
| Extended | 2 | 3 | 2 |

The PHICH duration puts a lower limit on the size of the control region signal by the PCFICH. For example, as seen in Table 1 and Table 3, when the system bandwidth is greater than 10 resource blocks, if the extended PHICH duration is indicated by higher layers then the UE assumes that the control region size is equal to the PHICH duration.

As seen in Table 3, if the PHICH duration is normal, for all non-MBSFN sub-frames and MBSFN sub-frames, the control region size is set to a lower limit of 1.

If the PHICH is of extended duration, if non-MBSFN sub-frame is used for sub-frames 1 and 6 of frame structure type 2, the control region size lower limit is 2 and in other cases for non-MBSFN sub-frames is 3.

For MBSFN sub-frames on a carrier supporting PDSCH, if the PHICH duration is extended, then the lower limit for the control region size is 2.

The PHICH configuration is included in the master information block (MIB) which is transmitted on the physical broadcast channel as follows:

```
MasterInformationBlock ::=    SEQUENCE {
    dl-Bandwidth              ENUMERATED {
                                  n6, n15, n25, n50, n75, n100},
    phich-Config              PHICH-Config,
    systemFrameNumber         BIT STRING (SIZE (8)),
    spare                     BIT STRING (SIZE (10))
}
PHICH-Config ::=              SEQUENCE {
    phich-Duration            ENUMERATED {normal, extended},
    phich-Resource            ENUMERATED {oneSixth, half, one,
two}
}
```

Cell-Specific Reference Signal

Figure 6:
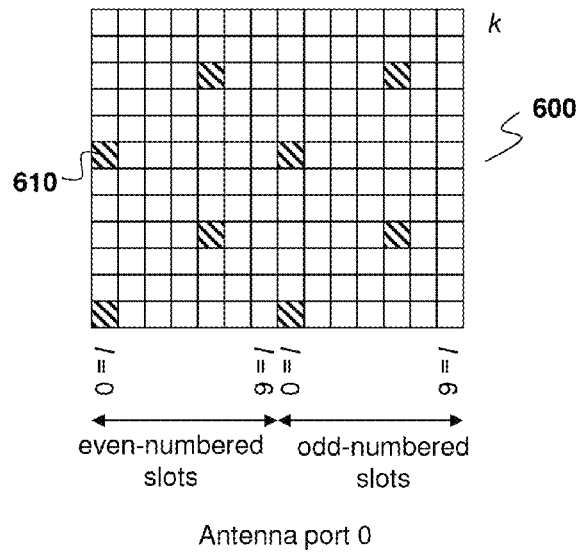
FIG. 6 is a diagram showing cell-specific reference signals with a single antenna port for normal cyclic prefix.
Figure 7:
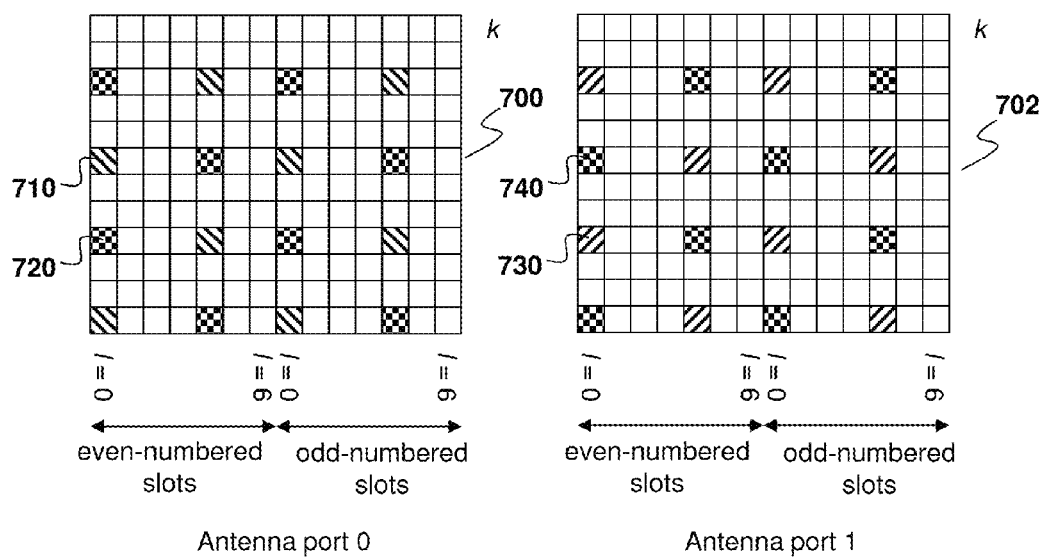
FIG. 7 is a diagram showing cell-specific reference signals with two antenna ports for normal cyclic prefix.
Figure 8:
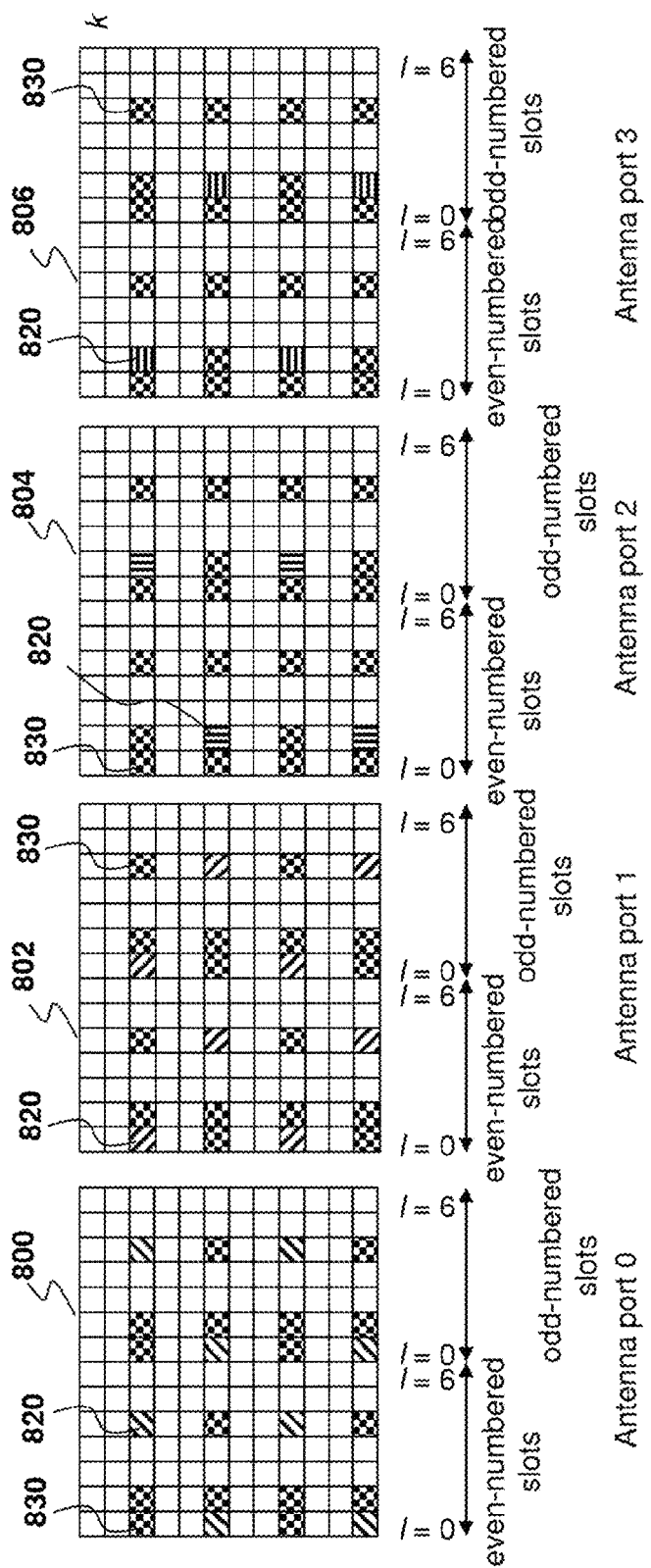
FIG. 8 is a diagram showing cell-specific reference signals with four antenna ports for normal cyclic prefix.

Depending on the number of antenna ports configured in the cell, the resource elements for CRS transmissions are shown in FIGS. 6, 7 and 8.

Referring to FIG. 6, FIG. 6 shows a signal 600 for one antenna port where the vertical axis is designated as k and represents the sub-carrier index of the resource element and the horizontal axis is represented by I and is the OFDM symbol index. Reference symbols 610 are shown within signal 600 and, as indicated in FIG. 6, OFDM symbols 0, 4, 7 and 11 contain the CRS.

Similarly, referring to FIG. 7, FIG. 7 shows signals for two antenna ports, a signal on the first antenna port being designated by reference numeral 700 and a signal on the second antenna port being designated by reference numeral 702.

As seen in FIG. 7, the first antenna port utilizes reference symbols 710 and again uses OFDM symbols 0, 4, 7 and 11. Further, certain resource elements, designated by reference numeral 720 are not used on first antenna port transmission. Similarly, the second antenna port transmission includes reference symbols 730 which are located in the element not used for signal 700 and the areas used for signal 700, designated by reference numeral 740, are not used in the second antenna port transmission.

Referring to FIG. 8, FIG. 8 shows the use of four antenna ports. In this case, OFDM symbols 0, 1, 4, 7, 8 and 11 are used. In the case of four antenna ports, four antenna port signals are shown, designated by reference numerals 800 for antenna port 0, 802 for antenna port 1, 804 for antenna port 2 and 806 for antenna port 3.

In each, reference symbols used on the antenna port are designated by reference numeral 820 and areas not used on the antenna port are designated by reference numeral 830. The position of the CRS on the vertical axis; k, is determined based on the cell identity.

Thus, based on the above, not every OFDM symbol needs to transmit CRS.

PCFICH Detection in the Presence of CRS Interference

PCFICH symbols transmitted by a pico cell may be corrupted by the CRS symbols of an ABS sub-frame concurrently transmitted by a nearby macro cell.

Figure 9:
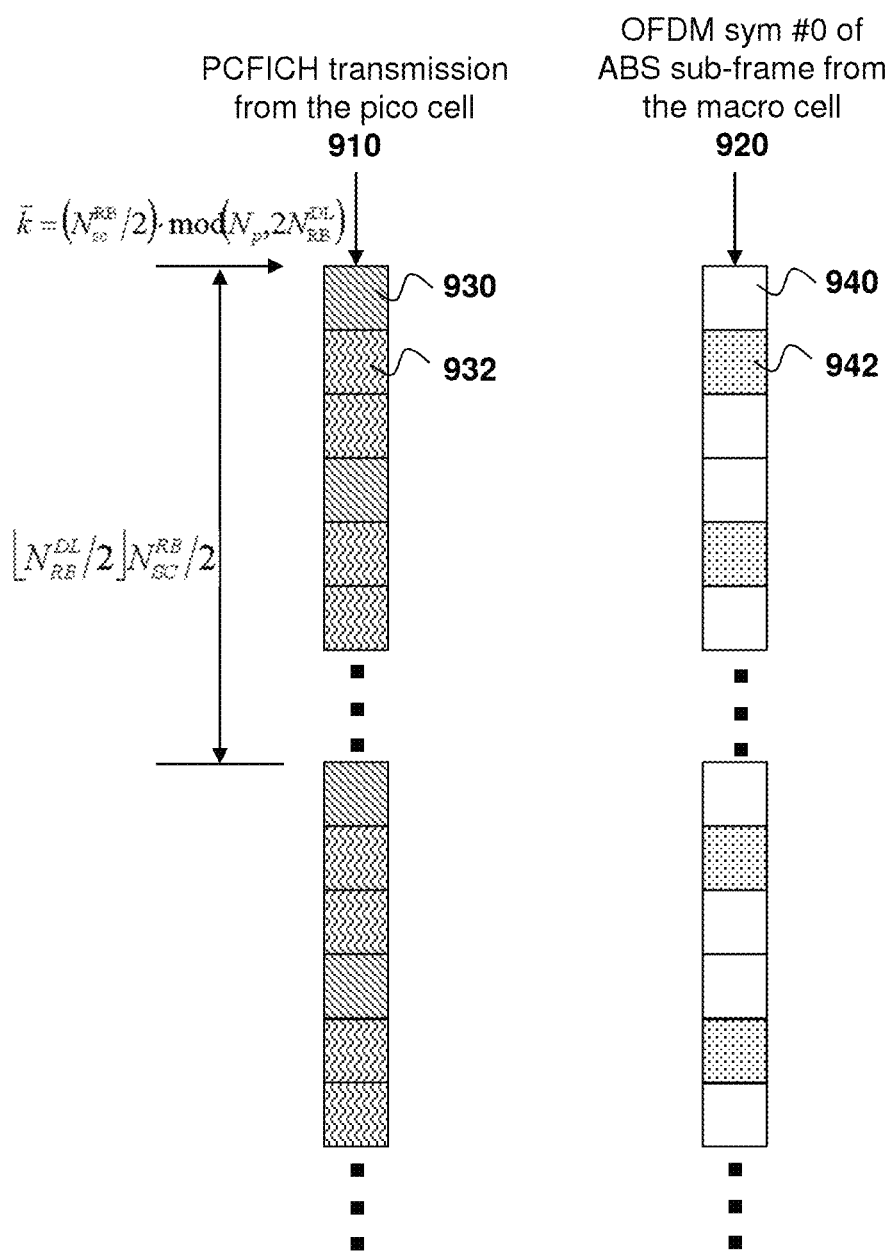
FIG. 9 is a timing diagram showing pico cell transmissions with OFDM symbol 0 ABS transmissions from a macro cell.

In particular, reference is now made to FIG. 9, which shows a PCFICH transmission from a pico cell 910 as well as an OFDM symbol 0 of ABS sub-frame from a macro cell 920. As shown in FIG. 9, the reference symbol reference element (RSRE) 930 is transmitted by the pico cell as shown. Further, the PCFICH symbol 932 is transmitted. As seen in FIG. 9, the RSRE 930 is followed by two PCFICH transmissions 932.

Assuming that the transmission from all cells across the network are sub-frame synchronized, in the same sub-frame as RSRE a null 940 is transmitted by the macro cell 920. However, a RSRE 942 is transmitted at the same time as a first PCFICH 932 and thus interferes with the PCFICH transmitted.

For the embodiment of FIG. 9, it is assumed that mod ($N_p$, 3) does not equal mod ($N_m$, 3). In other words, the CRS transmitted from the pico cell and macro cell doesn't collide or overlap. The cell identifiers of the pico cell and the macro cell are designated as $N_p$ and $N_m$ respectively As shown in FIG. 9, half of the PCFICH symbols are corrupted by the macro cells CRS. The received resource element at the UE, $r_k$, can be expressed as follows:

$$r_k = c_k^P s_k + c_k^M p_k + n_k \rightarrow \text{in the presence of CRS interference}$$

$$r_k = c_k^P s_k + n_k \rightarrow \text{otherwise} \quad (1)$$

In the above, $c_k^P$ and $c_k^M$ are channel weights corresponding to the communication link between the UE and the pico cell and the macro cell respectively. $s_k$ represents the PCFICH QPSK symbol transmitted at the $k^{th}$ resource element assigned for the PCFICH symbol transmission. $p_k$ represents the CRS symbol transmitted at the $k^{th}$ resource element by the macro cell, which is concurrent with the $k^{th}$ PCFICH resource element transmission from the pico cell.

One way of detecting the CFI by a UE attached to pico cells is by calculating the following metric, which represents a maximum likelihood sequence detection:

$$CFI = \min_i M(i) \quad (2)$$

$$M(i) = \sum_{k=0}^{15} |r_k - \hat{c}_k^p s_k(i)|^2 \quad (3)$$

From the above, $\hat{c}_k^p$ is the estimated channel weight for the $k^{th}$ resource element, which is obtained using the CRS transmitted by the pico cell.

The above is an example of a maximum likelihood detector. Similar metrics can be derived from other types of detectors.

Further, there are other detection techniques which may not need channel weight estimates. However, when the channel estimates are available, detection performance can be improved.

In the above $s_k(i)$ represents the PCFICH symbol sequence corresponding to CFI-i.

According to equation 2 above, the UE evaluates the metric M(i) for all three possibilities. In other words, the evaluation is for CFI=0, CFI=1 and CFI=2. The UE then picks the result which is the closest.

Furthermore, to reduce false detection probability a fixed threshold may be introduced as follows:

$$CFI = \min_i \{M(i) \text{ for all } (M(i) < \eta)\} \quad (4)$$

Where $\eta$ is a reliably threshold define based on the type of PCFICH detector. The detection mechanism described as depicted below with regard to FIG. 10.

Figure 10:
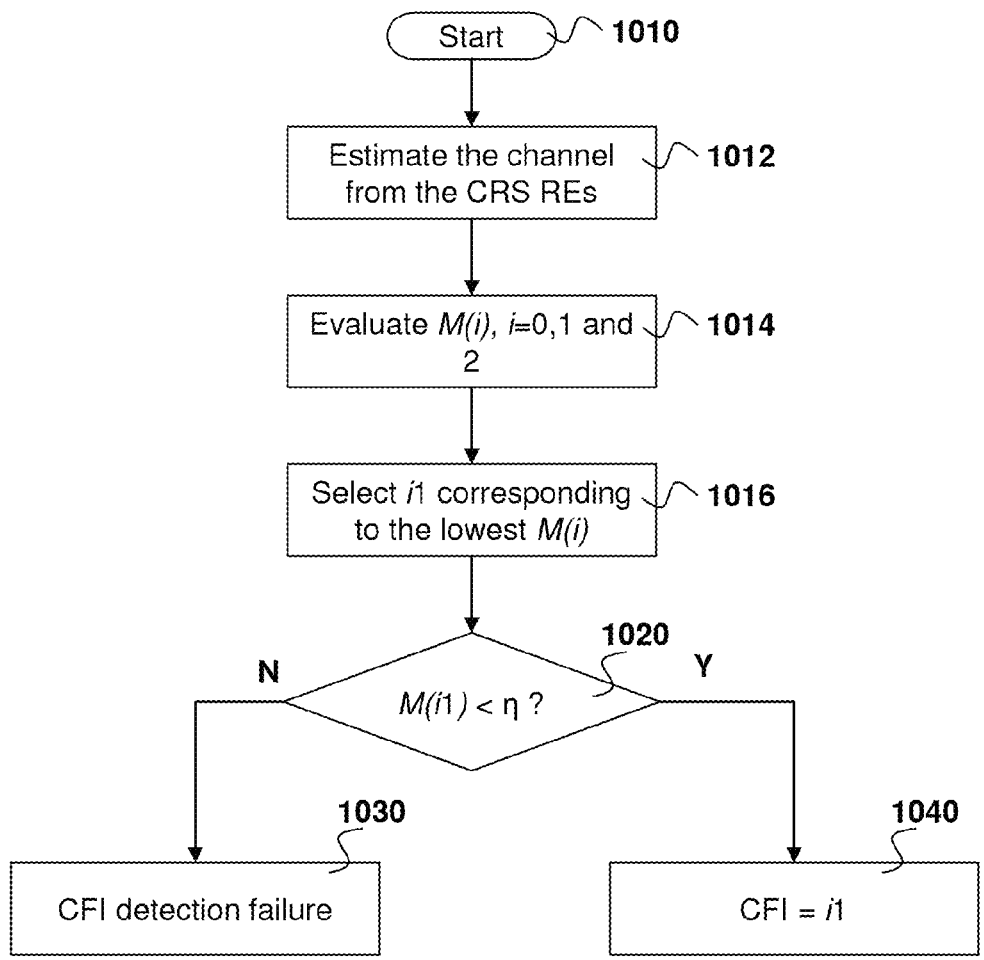
FIG. 10 is a process diagram showing a process at a receiver for CFI detection.

Referring to FIG. 10, the process starts at block 1010 and proceeds to block 1012 in which the channel is estimated from the CRS resource elements.

The process then proceeds to block 1014 in which the M(i) is evaluated for i=0, 1 and 2.

The process then proceeds to block 1016 in which the i1 is selected which corresponds to the lowest M(i).

The process then proceeds to block 1020 to determine whether the selected M(i1) is less than the reliability threshold. If no, then the process proceeds to block 1030 in which CFI detection failure is noted. Otherwise the process proceeds to block 1040 and CFI is determined to be i1.

The reliability threshold is normally defined in terms of the average noise power level. For example, $\eta$ can be expressed as follows:

$$\eta = \alpha \theta \quad (5)$$

Where $\theta$ represents the expected average power level of the noise and $\alpha$ is a positive integer greater than 1 and is decided by the receiver implementation.

The PCFICH sequence-i corresponding to a CFI value is found which minimizes the above maximum likelihood metric. As will be appreciated by those in the art having regard to the above, the above metric is better in the absence of inter cell interference. The presence of CRS interference causes the above metric to be sub optimal and thus results in detection failure.

The value of the reliability threshold is, in one embodiment, decided on implementation.

MIB Encoding

Figure 11:
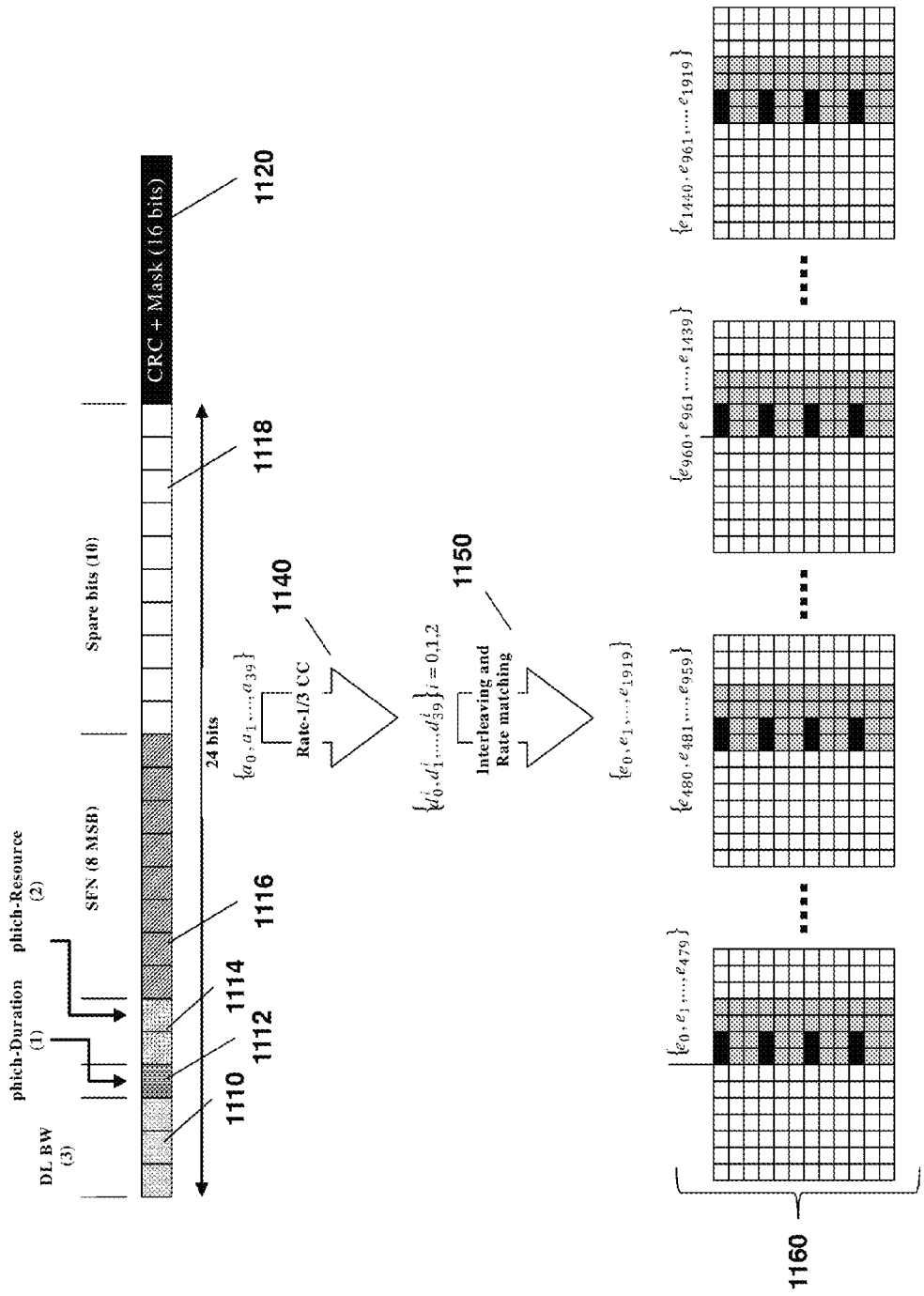
FIG. 11 is a process diagram showing MIB encoding.

Referring to FIG. 11, the figure shows existing MIB encoding performed by a serving cell. Fourteen bits of information indicating the downlink bandwidth (DL BW) 1110, PHICH duration 1112, PHICH-Resource 1114, the eight most significant bits of the system frame number (SFN) 1116 and ten spare bits 1118 are sent in the MIB along with a sixteen bit cyclic redundancy check (CRC) 1120. The ten spare bits are set to 0 according to the release 8/9/10 3GPP LTE specification. As used herein, LTE release 8, 9 or 10 UEs may be referred to as legacy UEs.

The forty bits are then ⅓ are convolution coded as shown by reference numeral 1140, interleaved and rate matched, as shown at arrow 1150, thereby producing four REGs, as shown by reference 1160.

The same coded bits are sent over four consecutive radio frames (in sub-frame number 0) as shown. The UE may try decoding the MIB based on the received information over one radio frame. If the CRC does not pass, the information received over the next radio frame is combined with the previously received MIB and the decoding may be tried again.

Based on the above, in an LTE-A heterogeneous network a UE may communicate with a weaker cell such as a pico UE in the RE area or a non-member UE in the coverage area of a CSG femto cell. Although the aggressor cell may blank the transmission or reduces the transmit power as much as possible during ABSs, the CRS still needs to be transmitted to avoid an impact on the channel estimate and RM/RLM/CQI measurements for legacy UEs. CRS can be transmitted at higher and constant power compared to other subcarriers to reach the cell edge.

The CRS transmission from the aggressor cell could degrade the signal reception at the UE in the victim cell. CRS interference may degrade the quality of the reception for all control and data channels, including the PCFICH, PHICH, PDCCH and PDSCH. However, the degradation of the PHICH, PDCCH and PDSCH could be small since these channels can be transmitted over multiple OFDM symbols and beyond the CRS-interfered OFDM symbols.

However, the PCFICH cannot reliably be detected under CRS interference when the interference level is relatively high. This is because the PCFICH is transmitted in the first OFDM symbol only and experiences significant interference from CRS. Simulation results have shown that when a signal from a serving cell is 15 dB lower than the signal from the interfering cell, PCFICH would have an irreducible error rate of 15%. Similarly, when the signal from the serving cell is 10 dB lower, the irreducible error rate is 3%. The above means that under such scenarios, the minimum performance of 1% error rate for PCFICH is unattainable, no matter how the power is increased from the serving cell.

Accordingly, there is a need for effectively obtaining information from the PCFICH by the UE in interfering situations described above. In a first embodiment, as described below, the CFI value is provided to the UE through one or more of secondary mechanisms, rather than using the conventional mechanism which uses PCFICH. The conventional mechanism can also be referred to as a primary mechanism or a first mechanism in the context of this document. In particular, in one embodiment, a UE may know the control region size of a victim cell without detecting the PCFICH. Various secondary mechanisms may include, but are not limited to, fixed control size, setting control region size equal to PHICH duration, transmitting CFI in the MIB, and a predefining the control size based on the sub-frame index.

In some embodiments, RRC signaling could be used to let a connected mode UE know when to enable or disable a secondary mechanism. Idle UEs could automatically enable or disable a secondary mechanism if the UE knows it is attached to a victim cell according to neighbor cell measurements. The control size of the victim cell may follow the secondary mechanism if there are connected UEs in the RE area or in a non-accessible CSG femto cell coverage area. To support idle UEs, a victim cell may follow the secondary mechanism during the sub-frames transmitting paging, SIB, and messages to and for random access procedure.

In a further embodiment, a solution may include improved PCFICH detection via side information. As provided above, when a UE tries to attach to an LTE network using a pico cell, the UE should be able to read the PCFICH reliably. During the ABS sub-frame transmission from the surrounding macro cells, UEs may not be able to read the PCFICH because the PCFICH resource elements are interfered with by the CRS transmission from the macro cell. One way of avoiding the problem is to puncture resource elements that see more interference. When a UE is already attached to a network, various vendor specific interference mitigation techniques may be employed at the UE. However, during initial network attachment, the UE may not have time to search for dominant interfering cells and to suppress them effectively. Thus, in certain embodiments, during initial network attachment, the UE may employ a smart receive which can improve the PCFICH detection probability. However, the detection techniques may be competitionally expensive and may cause UE battery drain. To reduce complexity, the serving cell can indicate a composite ABS pattern to help the UE appropriately select a receiver. Alternatively, the pico cell may increase the coding protection for PCFICH during the sub-frames whose transmission is concurrent with the ABS sub-frame transmission from any of the surrounding macro cells.

A third embodiment to improve PCFICH resource detection is to increase PCFICH resources. In this embodiment, in addition to current PCFICH resources, the CFI is transmitted on PHICH resources. The corresponding PHICH resources can be predetermined in a standards specification or can be configured by higher layer signaling. Two possible alternatives could include CFI information being mapped to PHICHs separately with PCFICH transmission or the encoded CFI value being based on current channel coding for CFI are repeated to the PHICH resources.

Secondary Mechanisms

In accordance with one embodiment of the present disclosure, secondary mechanisms for notifying the CFI value can be applied in an interfering situation so that the user equipment applying the techniques of the present disclosure may know the control region size of a weaker cell (victim cell) without detecting the PCFICH.

Fixed Control Size

In accordance with one embodiment, a secondary mechanism for notifying the CFI value may be to implement a fixed control size. UEs that implement the embodiment may have the knowledge of the fixed control size and would not need to perform PCFICH detection. Legacy UEs would not have the implicit knowledge and would still perform the PCFICH detection.

Fixed control size could be either specified in a standards specification with which the UE complies or may be signaled to the UE via non-PCFICH signaling. In one embodiment, the fixed control size can be embedded in the UEs when the UEs are manufactured and/or updated with a software program from a wireless carrier's server. In one embodiment, in order to support idle UEs, the fixed control size could be defined in a standards specification.

Thus, instead of requiring signaling, the preconfigured approach allows both idle and connected UEs to have knowledge of the victim cell's control size.

From a network perspective, the victim cell can have several options for implementing the above. Thus, in accordance with a first embodiment, the victim cell uses the preconfigured fixed control size for all sub-frames and transmits the corresponding CFI value on the PCFICH.

In a second option, the cell behavior may vary based on whether or not there are UEs in the RE or CSG femto coverage area. The control size of the victim cell complies with the secondary mechanism when connected UEs in the RE or CSG coverage areas and during the sub-frames transmitting paging, SIB, and Message 2 and 4 of random access procedures. The victim cell may know if there are connected UEs in the RE or CSG femto coverage areas as the victim cell needs to schedule these UEs during ABS sub-frames to avoid the strong interference from the aggressor cell. Thus, if there are no connected UEs in the RE or CSG femto area and during the sub-frames not for paging/SIB/random access message 2 and 4, the victim cell can use a control size different from the preconfigured size and transmit the actual control size on the PCFICH.

In a further option, the control size of the victim cell can comply with the secondary mechanism when connected UEs in the RE or CSG coverage areas are being scheduled and during the sub-frames transmitting paging, SIB, and Message 2 and 4 of random access procedure. Thus, the secondary mechanism in the third option can be utilized when the messages are scheduled for UEs in the RE or CSG coverage area. From the victim cell eNB perspective, the victim cell scheduler knows the connected UE in the RE or CSG coverage areas as the victim cell needs to schedule them during the ABS sub-frames of the aggressor cell and the victim cell eNB knows the sub-frames in which these victim UEs may be scheduled. The victim cell will make sure that during the sub-frames that the connected victim UEs are being scheduled, including SIBs and paging for notification of system information change, the control size of the victim cell may comply with the secondary mechanism.

From a UE perspective, the UE can simply apply a secondary mechanism to obtain the CFI value when it is in the RE or CSG coverage area.

In one embodiment, signaling may be used to indicate to the UE whether it is in or out of an RE or CSG coverage area.

For the macro-pico case, a connected mode UE is first considered.

A connected mode UE can use the secondary mechanism to obtain the control region size whenever it is associated with an RE-enabled pico cell. However, under current LTE specifications, the UE has no knowledge of whether it is communicating with the pico cell. Further, the UE does not now whether the pico employs RE or not. As a result, signaling is needed to let the UE know when it is handed into or handed out of an RE enabled pico cell. Additional bits in a handover message or some other RRC signaling can be introduced so that the UE explicitly knows when to enable or disable a secondary mechanism.

In one embodiment, two bits can be added to the mobilityControlInfo information element in handover message RRCConnectionReconfiguration, which is a message sent from the source eNB to the UE during handover. An example of the information element is shown below:

TABLE 4

MobilityControlInfo Information Element with two bits to
Enable/disable secondary mechanism

```
-- ASN1START
MobilityControlInfo ::= SEQUENCE {
    targetPhysCellId            PhysCellId,
    carrierFreq                 CarrierFreqEUTRA        OPTIONAL,    -- Cond HO-toEUTRA
    carrierBandwidth            CarrierBandwidthEUTRA   OPTIONAL,    -- Cond HO-toEUTRA
    additionalSpectrumEmission  AdditionalSpectrumEmission   OPTIONAL,  -- Cond HO-toEUTRA
    t304                        ENUMERATED {
                                    ms50, ms100, ms150, ms200, ms500, ms1000,
                                    ms2000, spare1},
    newUE-Identity              C-RNTI,
    radioResourceConfigCommon   RadioResourceConfigCommon,
    rach-ConfigDedicated        RACH-ConfigDedicated    OPTIONAL,    -- Need OP
    targetCFIvalue              INTEGER (0..3)          OPTIONAL,    -- Cond HetNet
    ...
}
CarrierBandwidthEUTRA ::= SEQUENCE {
    dl-Bandwidth                ENUMERATED {
                                    n6, n15, n25, n50, n75, n100, spare10,
                                    spare9, spare8, spare7, spare6, spare5,
                                    spare4, spare3, spare2, spare1},
    ul-Bandwidth                ENUMERATED {
                                    n6, n15, n25, n50, n75, n100, spare10,
                                    spare9, spare8, spare7, spare6, spare5,
                                    spare4, spare3, spare2, spare1}
    OPTIONAL -- Need OP
}
CarrierFreqEUTRA ::= SEQUENCE {
    dl-CarrierFreq              ARFCN-ValueEUTRA,
    ul-CarrierFreq              ARFCN-ValueEUTRA        OPTIONAL -- Cond FDD
}
-- ASN1STOP
```

In accordance with the above information element, a field, targetCFIvalue, can notify the UE of the fixed control size in the target cell and also serves the purpose of enabling or disabling the secondary mechanism. When the UE is handed over to an RE-enabled pico cell, the targetCFIvalue is set to a non-0 value to enable the secondary mechanism. If the UE is handed over to a macro or RE-disabled pico, the targetCFIvalue is set to 0 to disable the secondary mechanism. Thus the new targetCFIvalue field shows the fixed control size of the target cell. If 0, the UE may obtain CFI value via PCFICH detection in the target cell and disable the secondary mechanism. If the value is 1-3, the UE may enable the secondary mechanism and the targetCFIvalue represents the CFI value of the target cell If the fixed control size is a predefined value defined in the standards specification (for example, 3GPP TS 36.211, 3GPP TS 36.212, 3GPP TS 36.213 or 3GPP TS 36.331 in this embodiment), one bit in the mobilityControlInfo information element in the handover message, which forms part of the handover message as provided above, is shown below:

TABLE 5

MobilityControlInfo Information Element with one bit to
Enable/disable secondary mechanism

```
-- ASN1START
MobilityControlInfo ::= SEQUENCE {
    targetPhysCellId            PhysCellId,
    carrierFreq                 CarrierFreqEUTRA        OPTIONAL,    -- Cond HO-toEUTRA
    carrierBandwidth            CarrierBandwidthEUTRA   OPTIONAL,    -- Cond HO-toEUTRA
    additionalSpectrumEmission  AdditionalSpectrumEmission   OPTIONAL,  -- Cond HO-toEUTRA
    t304                        ENUMERATED {
                                    ms50, ms100, ms150, ms200, ms500, ms1000,
                                    ms2000, spare1},
    newUE-Identity              C-RNTI,
    radioResourceConfigCommon   RadioResourceConfigCommon,
```

TABLE 5-continued

MobilityControlInfo Information Element with one bit to
Enable/disable secondary mechanism

```
    rach-ConfigDedicated      RACH-ConfigDedicated    OPTIONAL,   -- Need OP
    CFI-SecondaryMechanism    BOOLEAN                 OPTIONAL,   -- Cond HetNet
    ...
}
CarrierBandwidthEUTRA ::=   SEQUENCE {
    dl-Bandwidth                ENUMERATED {
                                    n6, n15, n25, n50, n75, n100, spare10,
                                    spare9, spare8, spare7, spare6, spare5,
                                    spare4, spare3, spare2, spare1},
    ul-Bandwidth                ENUMERATED {
                                    n6, n15, n25, n50, n75, n100, spare10,
                                    spare9, spare8, spare7, spare6, spare5,
                                    spare4, spare3, spare2, spare1}
                                OPTIONAL -- Need OP
}
CarrierFreqEUTRA ::=     SEQUENCE {
    dl-CarrierFreq              ARFCN-ValueEUTRA,
    ul-CarrierFreq              ARFCN-ValueEUTRA        OPTIONAL -- Cond FDD
}
-- ASN1STOP
```

The one bit in the CFI-SecondaryMechanism above is sufficient to enable or disable a secondary mechanism. The CFI-SecondaryMechanism has a 0 value when the UE obtains the CFI value via PCFICH detection in the target cell and disables the secondary mechanism. If the value is 1, the UE can use the secondary mechanism to obtain the CFI value in the target cell. Further, to better support idle UEs, a fixed control size could be defined in the standard specification.

When a UE first powers up or goes from idle to connected, the UE could first connect to the strongest cell and use PCFICH detection. This strongest cell assumes that the UE is not in a CSG femto cell.

If the power up or idle to connected UE is in the pico RE area and the network wants to attach the UE to a pico, a handover would occur and the secondary mechanism would enable the targetCFIvalue or CFI-SecondaryMechanism in the handover command.

When a UE moves from the center of the pico cell into the RE area or moves from pico RE area into the center of the pico cell, an RRC message could be sent to the UE so that the UE enables or disables a secondary mechanism. For example, a one bit field CFI-SecondaryMechanism can be added to the RRCconnectionreconfiguration message. This message is sent from the pico eNB to the UE, and an example of the message is shown below:

TABLE 6

RRCConnectionReconfiguration message

```
-- ASN1START
RRCConnectionReconfiguration ::=    SEQUENCE {
    rrc-TransactionIdentifier       RRC-TransactionIdentifier,
    criticalExtensions                      CHOICE {
        c1                                      CHOICE{
rrcConnectionReconfiguration-r8 RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE { }
    }
}
RRCConnectionReconfiguration-r8-IEs ::= SEQUENCE {
    measConfig              MeasConfig              OPTIONAL,   -- Need ON
    mobilityControlInfo     MobilityControlInfo     OPTIONAL,   -- Cond HO
        dedicatedInfoNASList        SEQUENCE (SIZE(1..maxDRB)) OF
                                                DedicatedInfoNAS
            OPTIONAL,   -- Cond nonHO
        radioResourceConfigDedicated        RadioResourceConfigDedicated
            OPTIONAL, -- Cond HO-toEUTRA
    securityConfigHO        SecurityConfigHO        OPTIONAL,   -- Cond HO
        nonCriticalExtension        RRCConnectionReconfiguration-v890-IEs
        OPTIONAL
}
RRCConnectionReconfiguration-v890-IEs ::= SEQUENCE {
    lateNonCriticalExtension    OCTET STRING        OPTIONAL,   -- Need OP
        nonCriticalExtension        RRCConnectionReconfiguration-v920-IEs
        OPTIONAL
}
RRCConnectionReconfiguration-v920-IEs ::= SEQUENCE {
    otherConfig-r9          OtherConfig-r9          OPTIONAL,   -- Need ON
```

TABLE 6-continued

RRCConnectionReconfiguration message

```
fullConfig-r9          ENUMERATED {true}         OPTIONAL,    -- Cond HO-Reestab
    nonCriticalExtension    RRCConnectionReconfiguration-v1020-IEs
    OPTIONAL
}
RRCConnectionReconfiguration-v1020-IEs ::= SEQUENCE {
    sCellToReleaseList-r10      SCellToReleaseList-r10      OPTIONAL,
    -- Need ON
    sCellToAddModList-r10       SCellToAddModList-r10       OPTIONAL,
    -- Need ON
    nonCriticalExtension        RRCConnectionReconfiguration-v11xy-IEs
OPTIONAL
}
SCellToAddModList-r10 ::=       SEQUENCE (SIZE (1..maxSCell-r10)) OF
SCellToAddMod-r10
SCellToAddMod-r10 ::=       SEQUENCE {
    sCellIndex-r10          SCellIndex-r10,
    cellIdentification-r10      SEQUENCE {
        physCellId-r10          PhysCellId,
        dl-CarrierFreq-r10      ARFCN-ValueEUTRA
    }
                                OPTIONAL,    -- Cond SCellAdd
    radioResourceConfigCommonSCell-r10
    RadioResourceConfigCommonSCell-r10   OPTIONAL,       -- Cond SCellAdd
    radioResourceConfigDedicatedSCell-r10
    RadioResourceConfigDedicatedSCell-r10   OPTIONAL,    -- Cond SCellAdd2
    ...
}
SCellToReleaseList-r10 ::=    SEQUENCE (SIZE (1..maxSCell-r10)) OF SCellIndex-
r10
SecurityConfigHO ::=        SEQUENCE {
    handoverType            CHOICE {
        intraLTE            SEQUENCE {
            securityAlgorithmConfig     SecurityAlgorithmConfig     OPTIONAL,    --
Cond fullConfig
            keyChangeIndicator          BOOLEAN,
            nextHopChainingCount        NextHopChainingCount
        },
        interRAT        SEQUENCE {
            securityAlgorithmConfig         SecurityAlgorithmConfig,
            nas-SecurityParamToEUTRA        OCTET STRING (SIZE(6))
        }
    },
    ...
}
RRCConnectionReconfiguration-v11xy-IEs ::= SEQUENCE {
    CFI-SecondaryMechanism          ENUMERATED {enable, disable}
OPTIONAL,    -- Cond HetNet
    nonCriticalExtension            SEQUENCE { }            OPTIONAL --
Need OP
}
-- ASN1STOP
```

As shown above, the RRCConnectionReconfiguration message may be used to enable or disable a secondary mechanism of the UE.

When the network enables or disables signaling using the secondary mechanism based on the location of the device, the RE enabled pica cell can use a control size that complies with the secondary mechanism when there are UEs in the RE area or the UEs in the RE area are being scheduled. A connected UE can use the secondary mechanism to obtain the CFI value whenever it is in the RE area.

As a result, the above signaling lets the UE know whether or not it is in the RE area. Additional bits in the handover message as shown above allow the UE to enable or disable a secondary mechanism when the UE moves away from the macro and into the pico RE area or moves from the pico RE into the macro. The additional bits in the RRC message shown above could be used to enable or disable the secondary mechanism if the UE moves from the pico center area to the pico RE area or moves from the pico RE area to the pico center area.

Considering an idle UE, for a macro to pico deployment it is not necessary to apply range expansion for idle UEs. In other words, the UE could always camp on the strongest cell. If range expansion is desired for idle mode, the idle mode UE could autonomously enable or disable the secondary mechanisms if it knows it is attached to a victim cell according to the measurement of neighbor cells. In other words, the reference signal received power (RSRP) from the serving node is lower than the RSRP from the dominant interfering node by a certain threshold. The idle UE could use a secondary mechanism to obtain the CFI value no matter if the serving cell is a pico or a macro.

For the case of the macro-femto deployment, the scheduler of the macro eNB may know if it is connected to the macro UE but is within the coverage area of the CSG cell. Therefore, the macro eNB could send the UE RRC signaling to disable or enable the secondary mechanism when the UE moves in or out of the CSG coverage area. Similarly, in the case of a femto-femto deployment, the CSG would know if its connected member UE is in the coverage area of another CSG and hence send the RRC signaling to enable or disable the secondary mechanism. For an idle non-member UE in the coverage area of a CSG, the UE would autonomously enable or disable a secondary mechanism as the UE knows whether it is in the coverage area of a non-accessible CSG.

Figure 12:
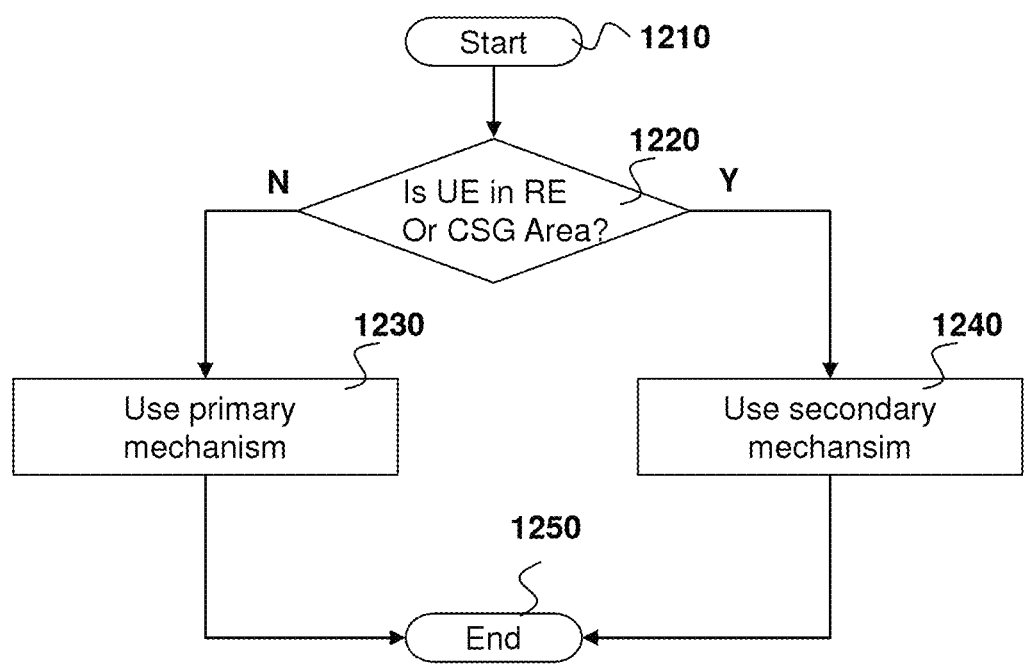
FIG. 12 is a process diagram at a user equipment showing the use of a secondary mechanism to obtain CFI.

Reference is now made to FIG. 12, which shows a process at UE in accordance with the above. In particular, the process of FIG. 12 starts at block 1210 and proceeds to block 1220 in which the UE checks whether it is in an RE area in the pico-macro scenario or is in the CSG area and not part of the closed group in the femto-macro scenario. The determination may be based on signaling from a network element or may be based on RSRP measurements made by an idle UE, as described above.

From block 1220, if the UE is in the RE or CSG area, the process proceeds to block 1240 in which the UE uses a secondary mechanism to determine the control region size. Utilizing the solution above, the secondary mechanism for block 1240 is a predetermined control region size.

From block 1220, if the UE is not in the RE or CSG area the process proceeds to block 1230 in which the primary mechanism for determining the control region size is used. Generally this may utilize the PCFICH signalling for the determination.

From blocks 1230 or 1240 the process proceeds to block 1250 and ends.

Figure 13:
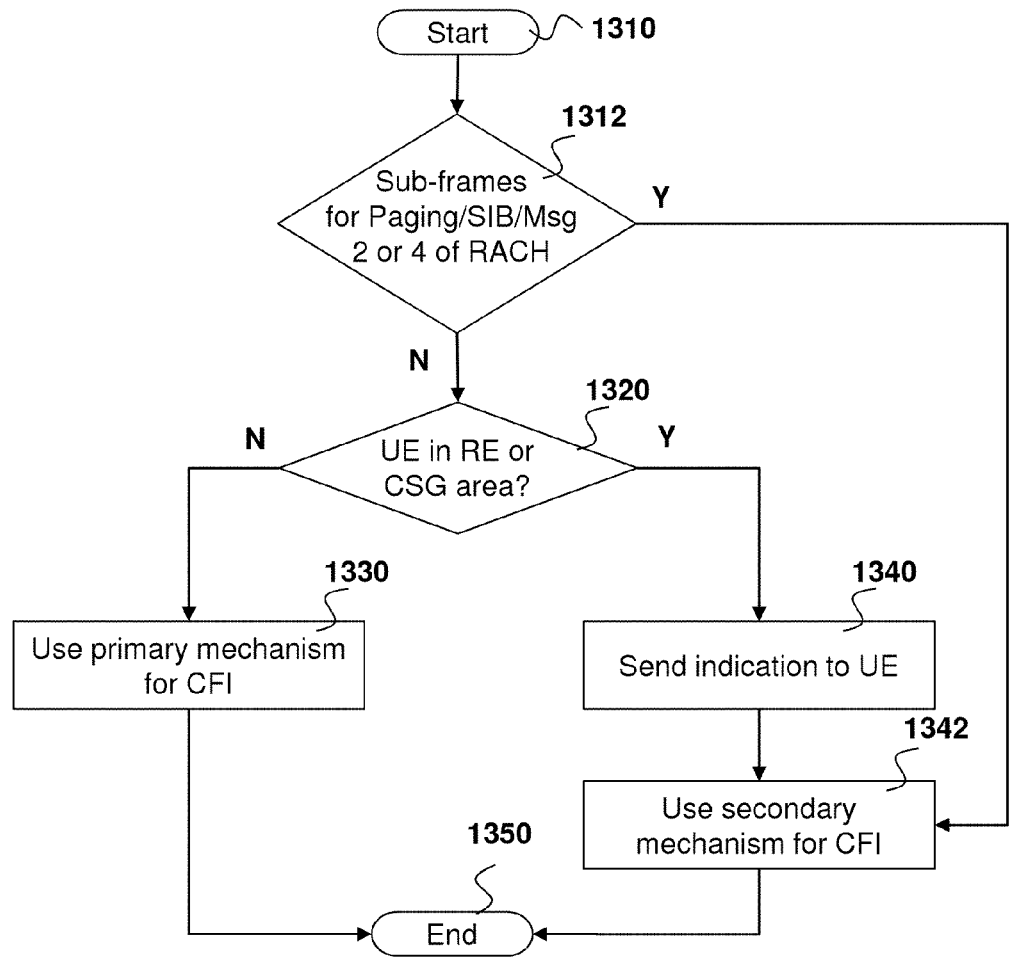
FIG. 13 is a process diagram at a network element showing the use of a secondary mechanism.

From the network perspective, a connected UE may be signaled when the UE enters or leaves the RE or CSG areas. Reference is now made to FIG. 13.

In FIG. 13 the process starts at block 1310 and proceeds to block 1312 in which a check is made to determine whether the sub-frame is for paging, SIB, or Message 2 or 4 for RACH. If no, the process proceeds to block 1320 in which the network element determines whether a UE has entered the RE or CSG areas. If no, the network element utilizes the primary mechanism for signaling control region size, as shown by block 1330.

Conversely, if a UE has entered the RE or CSG area the process proceeds from block 1320 to block 1340 in which an indication is sent to the UE to tell the UE that it is in such area. The indication may be sent over RRC signaling if the UE is in connected mode. The indication may be sent over non-RRC signaling if the UE is in idle mode.

From block 1340, or from block 1312 if the sub-frame is for paging SIB, or Message 2 or 4 for RACH, the process then proceeds to block 1342 in which the network element utilizes the second mechanism for signaling the CFI. In the above solution, the network element is constrained to the predetermined control region size.

From blocks 1330 and 1342 the process proceeds to block 1350 and ends.

Control Region Size to PHICH Duration

In a second solution for the secondary mechanism, the victim cell control region size is equal to the PHICH duration. The PHICH duration of a "normal" or an "extended" type can take the values defined in Table 3 above for the various sub-frame types. Since PHICH sets the minimum value of the control region size signal by the PCFICH, the embodiments described herein can specify that the control region takes the minimum value. UEs implementing the present embodiment may determine the control size via PHICH-duration in PBCH and would not need to perform PCFICH detection. Typically, the physical broadcast channel is more reliable than the PCFICH due to its lower code rate and repeated transmission. In addition, advanced interference coordination schemes may be implemented in future releases of the standard to further protect the PBCH of the weaker cell heterogeneous network.

For legacy mobile devices, the implicit knowledge within the PHICH is not understood and the legacy UE would then perform a PCFICH detection except in the case of a system bandwidth larger than 10 RBs with extended PCFICH duration, in which case the legacy UE may assume the CFI equals to the PHICH duration and may skip the PCFICH detection as well.

Compared to existing determination of the control region size based on PHICH duration, the embodiments herein do not require control regions to occupy the maximum amount of resources. Further, the victim cell may vary control size from sub-frame to sub-frame. For example, a victim cell control size is required to be equal to the PHICH duration when a connected mode UE in the RE or CSG coverage area is being scheduled and during the sub-frames transmitting paging/SIB/random access Message 2 and 4. The victim cell is allowed to use different control size for other sub-frames. Furthermore, the embodiments described herein work for all system bandwidths including the system bandwidths of less than or equal to 10 RBs, Regarding network behavior, the victim cell may have various options. If the control size of the victim cell complies with the secondary mechanism for all sub-frames, in accordance with the above embodiment, the victim cell sets the control size the same as the PHICH duration for all sub-frames and transmits the corresponding CFI value on the PCFICH.

Conversely, the control size of the victim cell could comply with the secondary mechanism only when there are connected UEs in the RE or CSG coverage area and during the sub-frames transmitting paging, SIB, and Message 2 and 4 of the random access procedure. When there are no connected UEs in the RE or CSG coverage areas and during sub-frames not for paging/SIB/random access message 2 and 4, the victim cell can use a control size different from the PHICH duration and transmit this different control size on the PCFICH.

Further, if the network uses control size of the victim cell in accordance with the secondary mechanism only when there are connected UEs in the RE or CSG coverage area that are being scheduled, then the victim cell may use the PHICH duration only in those sub-frames where there is a UE in the RE or CSG coverage area that is being scheduled and during the subframes transmitting paging, SIB, and Message 2 and 4 of the random access procedure.

From the UE perspective, one bit in the mobilityControlInfo information element described above in Table 5 can be used to enable or disable the secondary mechanism if the UE moves from the macro area into the pico RE area or moves from the pico RE area into the macro area. Similar to the above for a fixed size, one bit in the RRC message RRCconnectionreconfiguration described above in Table 6 could be used to enable or disable the secondary mechanism if the UE moves from the pico center to the pico RE area or moves from the pico RE area to the pico center. When the secondary mechanism is enabled, the UE may obtain the CFI value from the PHICH duration via MIB detection. In current LTE specifications, the UE is not required to read the MIB or SIBs of the target cell until a handover is completed. However, for example, in the case of a UE handed from macro into a pico RE area, it may be desirable for the UE to obtain the PHICH information in the MIB of the target cell before the handover is completed. Further, no additional signaling is needed since the PHICH configuration on the target cell is already carried in the handover command message in the current LTE specifications. Specifically, the field RadioResourceConfigureCommon in the mobilityControlInfo contains the element phich-Contig.

Referring again to FIGS. 12 and 13, utilizing the secondary mechanism of setting the control region size to PHICH duration, at block 1342 network element sets the PHICH duration and control region size to match and the UE at block 1240 uses the PHICH duration information to detect the control region size.

Transmit CFI in MIB

In accordance with a third option for secondary sources, the victim cell may include the CFI value in the MIB. The MIB is broadcast from the eNB to the UE. Potential changes to the MIB are shown below:

TABLE 7

CFI value in MIB

```
-- ASN1START
MasterInformationBlock ::= SEQUENCE {
    dl-Bandwidth              ENUMERATED {
                                n6, n15, n25, n50, n75, n100},
    phich-Config              PHICH-Config,
    systemFrameNumber         BIT STRING (SIZE (8)),
    CFIvalueSecondaryMechanism  BIT STRING (SIZE (2))
    spare                     BIT STRING (SIZE (8))
}
-- ASN1STOP
```

To transmit three different CFI values, two bits are included in the MIB. The two bits from the spare bits defined in the LTE Release 8 MIB could be used. Therefore, there is no impact on legacy UEs. UEs according to the above embodiments detect the MIB to obtain the CFI value and would not need to perform PCFICH detection. The legacy UE would perform PCFICH detection to know the control region size. Similar to the PHICH duration examples above, it is expected that the UE according to the above embodiments can better detect the CFI from the MIB than from the PCFICH due to the robustness of the PBCH.

From the network perspective, if the control region size of the victim cells complies with the secondary mechanism for all sub-frames, the victim cell could set the control size to be the same as the CFI value broadcast in the MIB for all sub-frames and transmits a corresponding CFI value on the PCFICH.

Conversely, if the control size of the victim cell complies with the secondary mechanisms only when there are connected UEs in the RE or CSG coverage area and during the sub-frames transmitting paging, SIB, and Message 2 and 4 of the random access procedure, then the victim cell may still send a CFI value in the MIB. If there are no connected UEs in the RE or CSG coverage area and during sub-frames not for paging/SIB/random access Message 2 and 4, although there is a CFI value indicated in the MIB, the victim cell can use control sizes different from the CFI value in the MIB and broadcast the used control size on the PCFICH.

Similarly, if the victim cell only uses the secondary mechanism when there are connected UEs in the RE or CSG coverage area that are being scheduled, the victim cell could utilize a control size different from the CFI value broadcast in the MIB. In other words, the victim cell could use a different control size and broadcast this on the PCFICH when no UEs in the RE or CSG coverage area are scheduled and during sub-frames not for paging/SIB/random access Message 2 and 4.

From the UE perspective, in order to determine whether the UE is in the RE area, one bit in the mobilityControlInfo in a handover message as shown above with regard to Table 5 could be used to enable or disable the secondary mechanism if the UE moves from the macro area into the pico RE area or moves from the pico RE area into the macro area. Similar to the fixed CFI size examples above, the RRC message RRCconnectionreconfiguration shown above in Table 6 could be used to enable the secondary mechanism if the UE moves from the pico center to the pico RE area or moves from the pico RE area to the pico center area.

When the secondary mechanism is enabled, the UE may obtain the CFI value via MIB detection. Since the UE is not required to read the MIB or SIBs of the target cell until a handover is completed, the CFI value could be included in the field radioResourceConfigCommon of the mobilityControlInfo in the handover command as shown below in Table 8. This message is sent in a handover command from the source eNB to the UE. This allows the UE to obtain the CFI value without decoding the target cell's MIB. See, for example, Table 8 below.

TABLE 8

CFI value in handover message

```
RadioResourceConfigCommon ::= SEQUENCE {
    rach-ConfigCommon         RACH-ConfigCommon        OPTIONAL,   -- Need ON
    prach-Config              PRACH-Config,
    pdsch-ConfigCommon        PDSCH-ConfigCommon       OPTIONAL,   -- Need ON
    pusch-ConfigCommon        PUSCH-ConfigCommon,
    phich-Config              PHICH-Config             OPTIONAL,   -- Need ON
    CFI                       INTEGER (1..3),          OPTIONAL,   -- Cond HetNet
    pucch-ConfigCommon        PUCCH-ConfigCommon       OPTIONAL,   -- Need ON
    soundingRS-UL-ConfigCommon  SoundingRS-UL-ConfigCommon
        OPTIONAL,   -- Need ON
    uplinkPowerControlCommon  UplinkPowerControlCommon OPTIONAL, --
    Need ON
    antennaInfoCommon         AntennaInfoCommon        OPTIONAL,   -- Need ON
    p-Max                     P-Max                    OPTIONAL,   -- Need OP
    tdd-Config                TDD-Config               OPTIONAL,   -- Cond TDD
    ul-CyclicPrefixLength     UL-CyclicPrefixLength,
    ...
}
```

Even if the network only complies with the secondary mechanism when there are UEs in the RE or CSG areas, or when these UEs are being scheduled, from the UE perspective, the UE may always use the secondary mechanism to obtain control region size when in the RE or CSG area.

For an idle UE, similar procedures to those described above for an idle UE in the fixed control size embodiment would be used for the MIB signaling embodiment.

Referring again to FIGS. 12 and 13, for the MIB signaling embodiment, the network element at block 1340 sets the CFI value in the MIB and uses this value when secondary mechanisms are required. For the UE, at block 1240 the UE detects the MIB and uses the CFI value when in an RE or CSG area.

Predefine the Control Size Based on Sub-frame Index

In a further option for secondary mechanisms, the victim cell uses a preconfigured relationship between the control size and sub-frame index. For example, the control region size may equal the sub-frame index within a radio frame mod 3+1.

The victim cell is responsible to make sure that the PHICH duration is less than or equal to the control region size. Since the PHICH duration cannot be changed faster than every 40 milliseconds, in above example the PHICH duration may be limited to 1 OFDM symbol. The UE may have knowledge of the sub-frame index of the victim cell by detecting the PSS/SSS, which the UE may be able to reliably detect in low signal to interference plus noise ratio (SINR).

The use of the predefined control size based on the sub-frame index may be used by UEs implementing the present embodiment, but would not apply to legacy UEs. For legacy UEs, the PCFICH detection would still need to be used to know the control region size.

Further, when an aggressor cell configures the number of ABS sub-frames, the locations of the ABS sub-frames may need to also take into account the victim cells PDCCH capacity of each sub-frame.

From the network perspective, if the network sets the control size of the victim cells to comply with the secondary mechanism for all sub-frames, then the victim cell may use the predefined function of the sub-frame index to configure the control region size and broadcast the corresponding CFI value on the PCFICH.

Conversely, the network could only comply with a secondary mechanism when there are connected UEs in the RE or CSG coverage areas, and during the sub-frames transmitting paging, SIB, and Message 2 and 4 of random access procedures. When there are no connected UEs in the RE or CSG coverage areas and during the sub-frames not for paging/SIB/random access Message 2 and 4, the control size of the victim cell does not have to be a function of the sub-frame index and the victim cell may broadcast a different control size on the PCFICH.

Further, if the control size of the victim cell complies with the secondary mechanisms when there are connected UEs in the RE or CSG coverage area that are being scheduled and during the sub-frames transmitting paging, SIB, and message 2 and 4 of random access procedures, the victim cell may not be required to use a control size as a function of the sub-frame index when there are no UEs in the RE or CSG coverage area that are being scheduled and during the sub-frames not for paging/SIB/random access Message 2 and 4. Thus, the victim cell can broadcast a different control size on the PCFICH.

From a UE perspective, a 1 bit handover message as shown above in Table 5 for the mobilityControlInfo information element can be used to enable or disable a secondary mechanism if the UE moves from the macro area into the pico RE area or moves from the pico RE area into the macro area. Further, an RRC message such as the RRCconnection-reconfiguration message shown in Table 6 could be used to enable a secondary mechanism if the UE moves from the pico center area to the pico RE area or moves from the pico RE area to the pico center area. When the secondary mechanism is enabled, the UE may derive the CFI value based on the sub-frame index.

Referring again to FIGS. 12 and 13, the network element, at block 1342, may set the CFI value to correspond to the sub-frame index. A UE, at block 1240, may use the sub-frame index to determine the CFI value rather than relying on PCFICH.

For the above examples of secondary mechanisms, in the case of a macro-femto deployment, the scheduler of the macro eNB may know if the connected macro UE is in the coverage area of the CSG cell. Therefore, the macro eNB could send the UE RRC signaling to enable or disable secondary mechanism when the UE moves into or out of the CSG coverage area. Similarly, in case of the femto to femto deployment the CSG would know if it is a connected member UE is in the coverage area of another CSG and hence send the RRC signaling to enable or disable the secondary mechanism. Further, an idle UE would know if it is in the coverage area of a CSG and could autonomously enable or disable a secondary mechanism.

Improve PCFICH Detection Performance

In a second set of embodiments, one way to improve PCFICH performance in the presence of CRS interference is to use a modified detection and processing scheme. In particular, the second set of embodiments calculates two sequences of metrics, where each sequence of metrics corresponds with a set of resource elements. For example, a first sequence of metrics may relate to even resource elements and a second sequence of metrics may relate to odd resource elements. The sequences involve the selection of all possible CFI values and calculating probability metrics for the results within each sequence.

Thus, for example, a first sequence may be the probability metric results of, plugging in possible CFI values for all even resource elements. Similarly, the second sequence may be a sequence of result from plugging in CFI values for odd resource elements.

After the sequences are calculated, according to the second set of embodiments a third sequence of metrics can be calculated, where the third sequence of metrics is a function of the first two sequences of metrics. In one example, the function can be the minimum of the two sequences. Other examples of functions are possible.

A check can then be made to determine if the third set of metrics is lower than a threshold, and if yes, a control format indicator could be chosen to correspond with the lowest metric in the third sequence.

In one embodiment, the following equations 6 and 7 can be used together in detecting and processing PCFICH instead of equation 3.

$$M1(i) = \sum_{k=0}^{7} |r_{2k} - \hat{c}_{2k}^p s_{2k}(i)|^2 \quad (6)$$

$$M2(i) = \sum_{k=0}^{7} |r_{2k+1} - \hat{c}_{2k+1}^p s_{2k+1}(i)|^2 \quad (7)$$

Equation 6 above is the distance metric resulting from one set of resource elements (for example even) and equation 7 is from another set of resource elements (for example odd)

used for transmitting PCFICH. As shown in FIG. 9, the CRS corrupts either the odd or even symbols based on the cell IDs $N_p$ and $N_m$.

If the UE can calculate the metrics M1 and M2 separately for each CFI sequence and check whether one of them passes a reliability check, PCFICH detection errors can be reduced. One way of performing this check is to evaluate a new metric, M3 as M3(i)=Min{M1(i), M2(i)} for all i.

Figure 14:
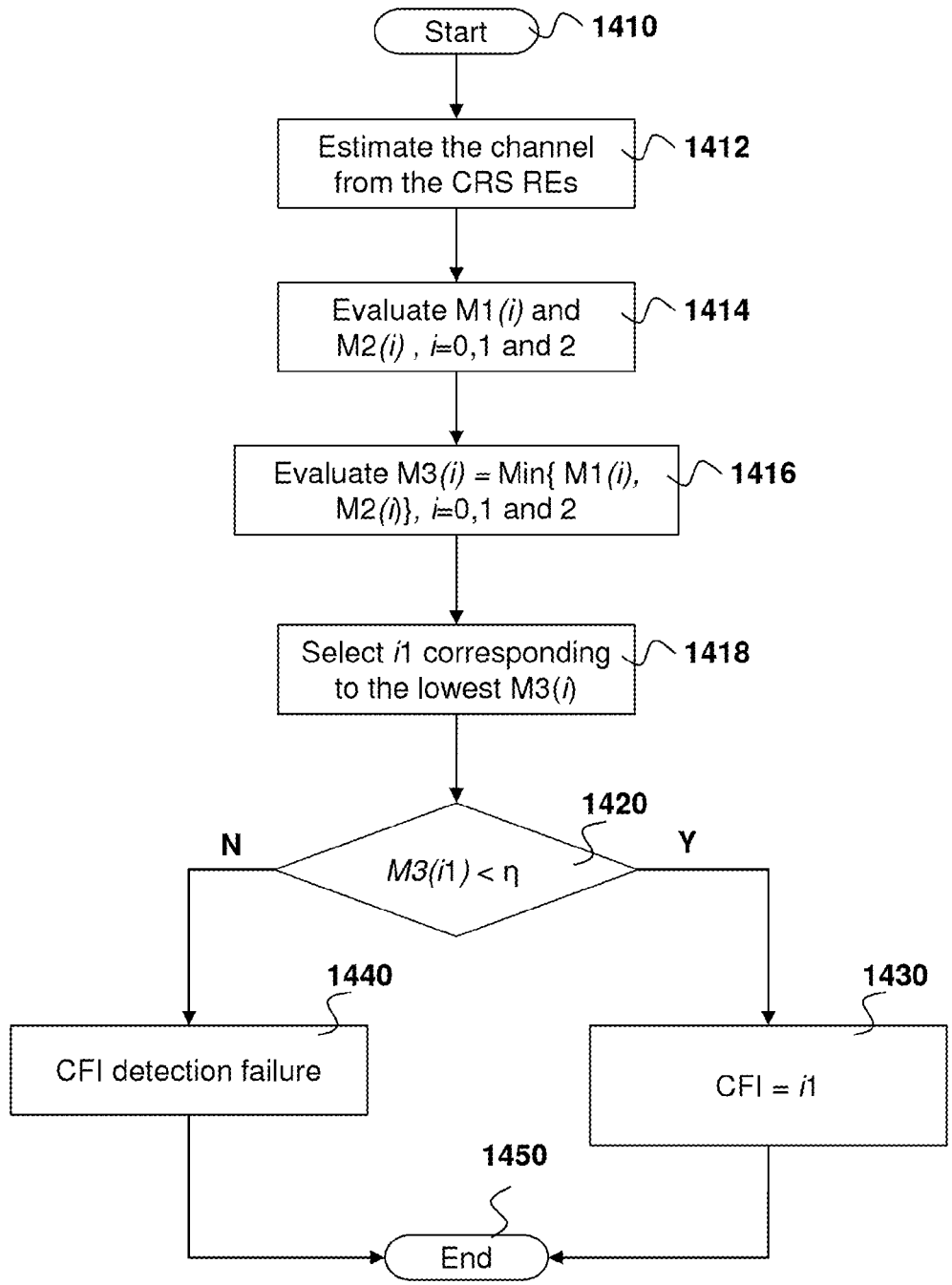
FIG. 14 is a process diagram at a receiver for robust reception of a PCFICH.

Reference is now made to FIG. 14. The process of FIG. 14 starts at block 1410 and proceeds to block 1412 in which the channel is estimated from the CRS REs.

The process then proceeds to block 1414 in which M1 and M2 are evaluated for all values of i, where i is 0, 1 and 2.

The process then proceeds to block 1416 in which M3 is evaluated as the minimum of M1 and M2 for all the values of i.

The process then proceeds from block 1416 to block 1418 in which a value for i is selected for the lowest M3, designated as i1.

The process then proceeds to block 1420 to determine whether or not the M3 with the i1 value selected at block 1418 is less than a threshold. If yes, then the process proceeds to block 1430 and sets the CFI equal to i1.

If the check at block 1420 determines that M3(i1) is greater than the threshold then the process proceeds to block 1440 in which CFI detection failure is noted.

From block 1430 and block 1440, the process proceeds to block 1450 and ends.

Figure 15:
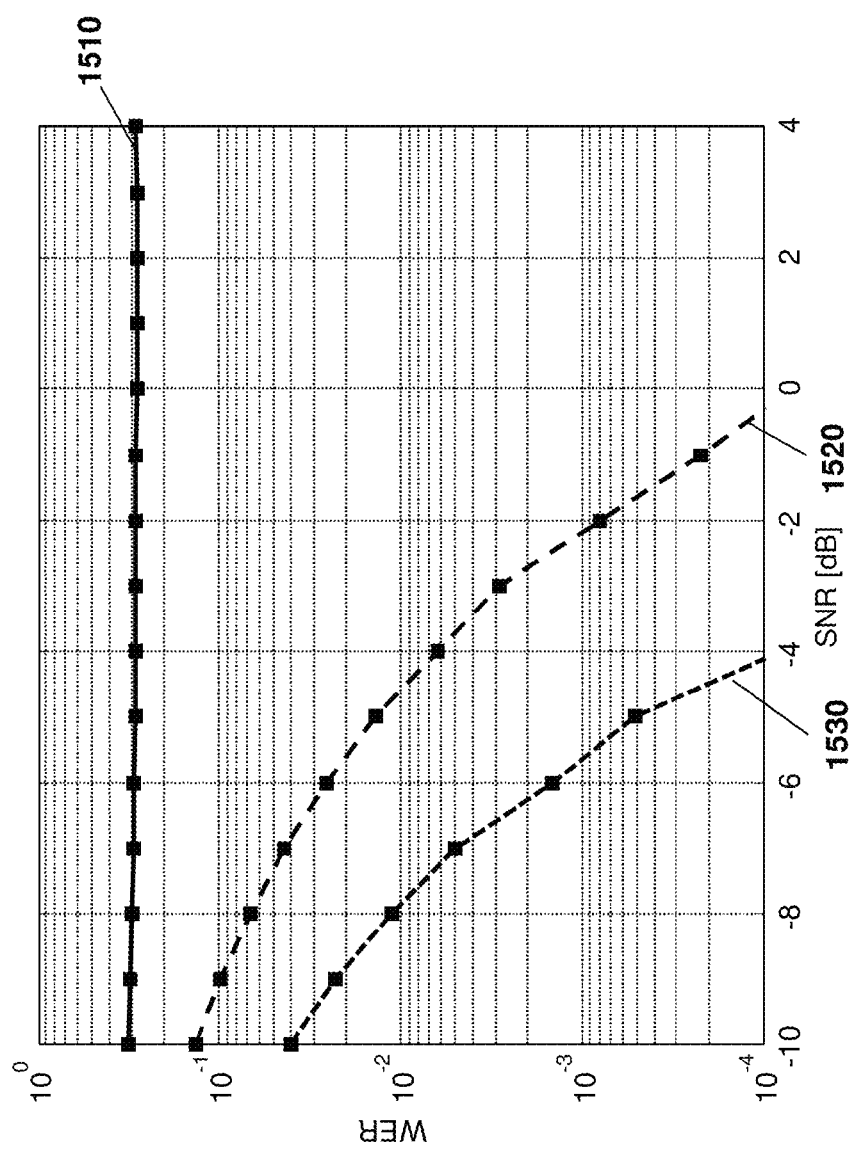
FIG. 15 is a plot showing WER versus SNR for a comparative example receiver, a first example receiver and a second example receiver.

Using the embodiment of FIG. 14, results are shown with regard to FIG. 15. FIG. 15 shows the PCFICH word error rate (WER) performance as a function of signal to noise ratio when a signal to interference ratio is −16 DB. Here the signal to interference ratio is defined as the ratio between the powers of the received signal from the pico cell to the received signal from the macro cell over the resource element the CRS in transmitted on. Signal to noise ratio is defined as the ratio of the powers of the received signal from the pico cell to the thermal noise at the UE. The depicted results do not include channel estimation penalties.

The CRS from the macro cell is changed for each simulation such that mod($N_p$, 3) does not equal mod($N_m$, 3). The WER based on a comparative example RX 1510, based on the receiver in FIG. 10 above, is compared with a first example RX 1520 of FIG. 14 above. Further the performance of an second example receiver (second example RX) is also shown as line 1530. The second example receiver is a receiver which has a prior knowledge of the interfering CRS transmission from the macro cell. The results presented for the second example receiver may also be interpreted as results when there is no CRS interference.

As seen from FIG. 15, the results from the first example RX outperforms the comparative example RX. However, the performance of the first example RX is degraded compared to the second example RX. This degradation can be attributed to the loss in processing gain which is approximately equal to the ratio of the number of symbols used in the PCFICH word detection algorithm. The asymptotic performance loss expected of the first example RX compared to the second example RX is approximately 3 DB.

Further, during non-ABS sub-frames or whenever there is a finite power transmission over date resource elements, UEs may still benefit from detecting the PCFICH using the metric in equation 2 or the comparative example RX to get full processing gain.

Figure 16:
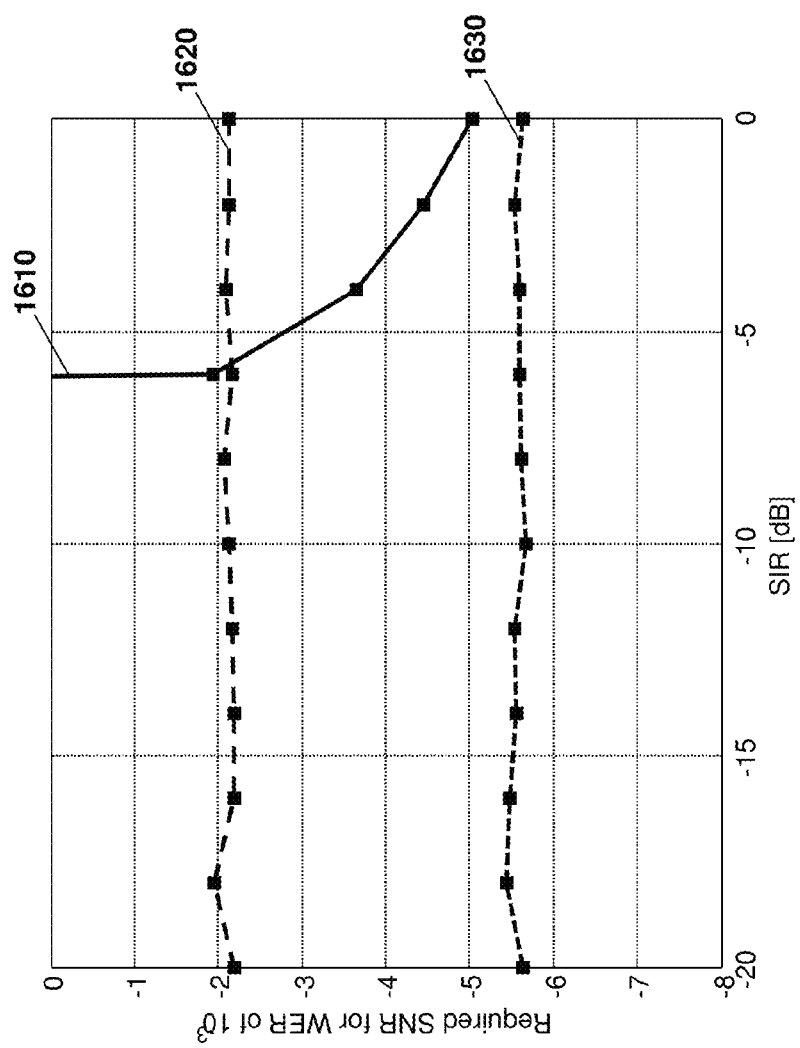
FIG. 16 is a plot showing required SNR for WER versus SIR for a comparative example receiver, a first example receiver and a second example receiver.

Referring to FIG. 16, the figure shows the required SNR for a PCFICH WER of $10^{-3}$. It is evident from the results of FIG. 16 that the performance of the comparative example RX outperforms the first example RX in high signal to interference ratio (SIR) regions of above −6 DB.

In particular, referring to FIG. 16, the comparative example RX is shown at reference 1610, the first example RX is shown at reference 1620 and the second example RX is shown at reference 1630.

As seen in FIG. 16, when above −6 DB the comparative example RX outperforms the first example RX.

To improve performance of the first example RX in high SIR regions, the detector of FIG. 14 above can be modified.

Figure 17:
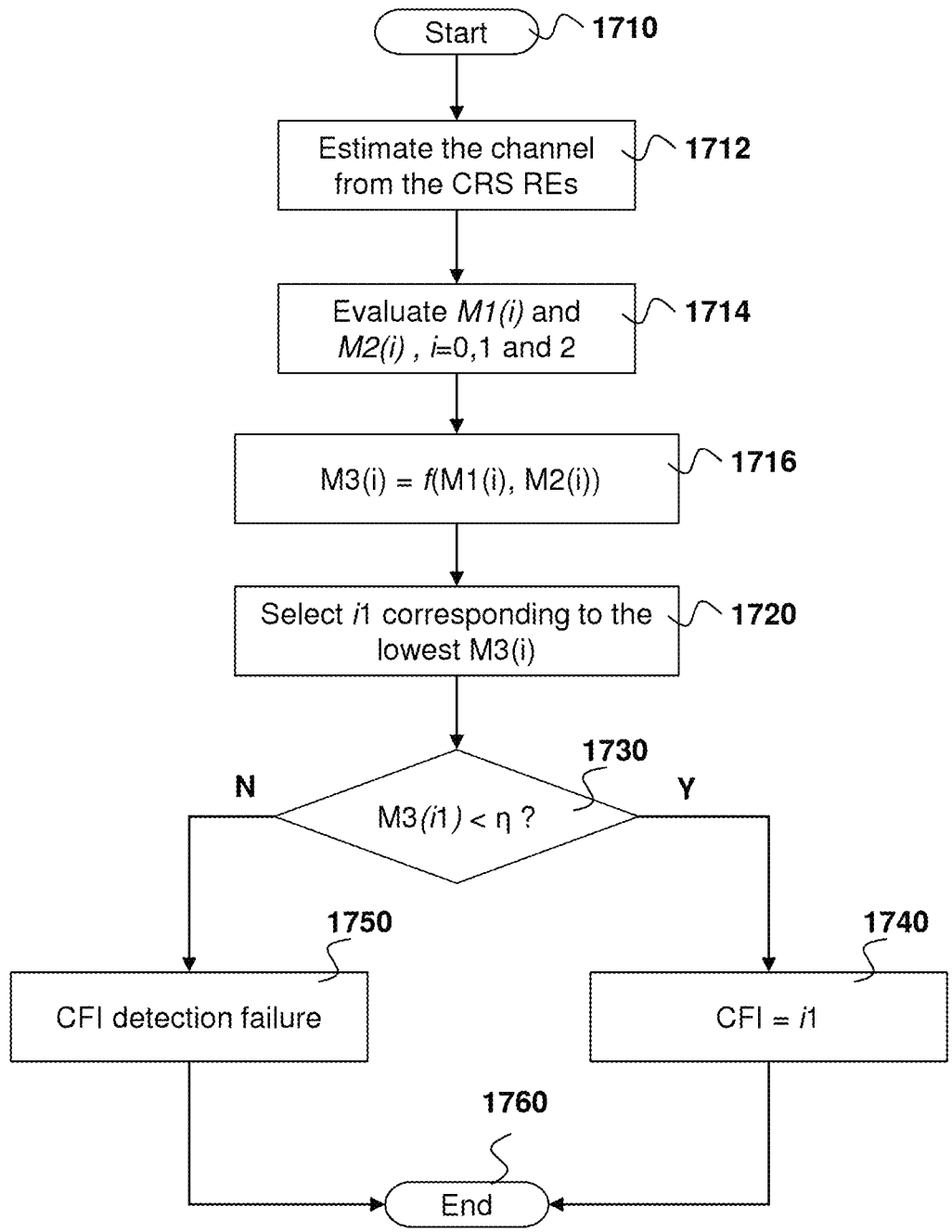
FIG. 17 is a process diagram showing a further receiver for robust reception of PCFICH.

Reference is now made to FIG. 17. In FIG. 17, a new metric M3 is defined as a function of M1 and M2. The new metric calculated such that the metrics M1 and M2 are added based on the respective reliabilities.

$$M3(i)=f(M1(i),M2(i)) \qquad (8)$$

In one example, the function can be expressed as follows:

$$f(x, y) = \text{Min}\{x, y\} - \hat{N}_0 \ln\left[\exp\left(-\frac{|x-y|}{\hat{N}_0}\right) + 1\right] \qquad (9)$$

Where $\hat{N}_0$ is an estimate of the variance of noise plus interference.

Thus, according to FIG. 17, the process starts at 1710 and proceeds to block 1712 in which a channel estimate is made from the CRS REs.

The process then proceeds to block 1714 in which M1(i) and M2(i) are evaluated, where i is 0, 1 and 2.

The process then proceeds to block 1716 in which M3(i) is created, where M3(i) is a function of M1(i) and M2(i).

The process then proceeds to block 1720 and selects an i1 value corresponding to the lowest M3(i).

From block 1720 the process proceeds to block 1730 and checks whether M3(i) is less than a threshold. If yes, then the process proceeds to block 1740 in which the CFI is set to i1.

From block 1730, if the M3(i1) is not less than a threshold then the process proceeds to block 1750 and a CFI detection failure is noted. From block 1740 or 1750 the process proceeds to block 1760 and ends.

Thus, a third example receiver is defined and called RX-2 herein. The performance of RX-2 is shown below with regard to FIG. 18 at an SIR of −6 DB.

Figure 18:
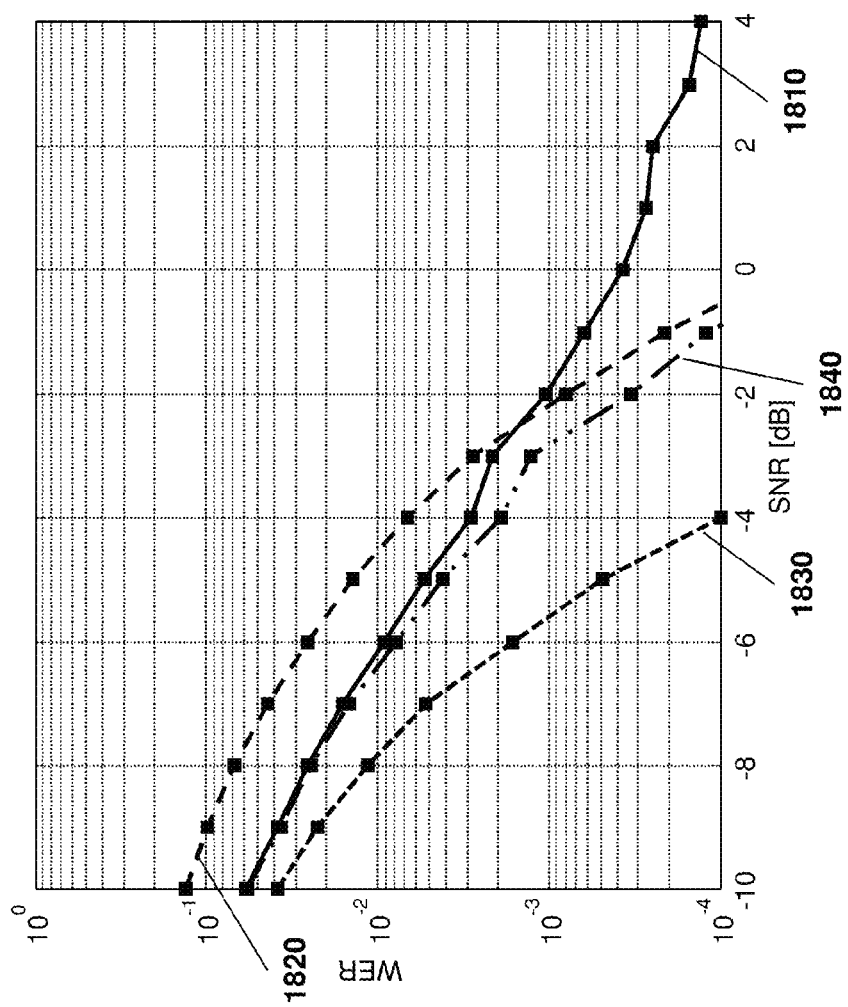
FIG. 18 is a plot showing WER versus SNR for a comparative example receiver, a first example receiver, a second example receiver and third example receiver.

As seen in FIG. 18, the comparative example RX is denoted as reference numeral 1810, first example RX (RX-1) is denoted by reference numeral 1820, the second example RX is denoted as reference numeral 1830 and the RX-2 is denoted as reference numeral 1840.

Figure 19:
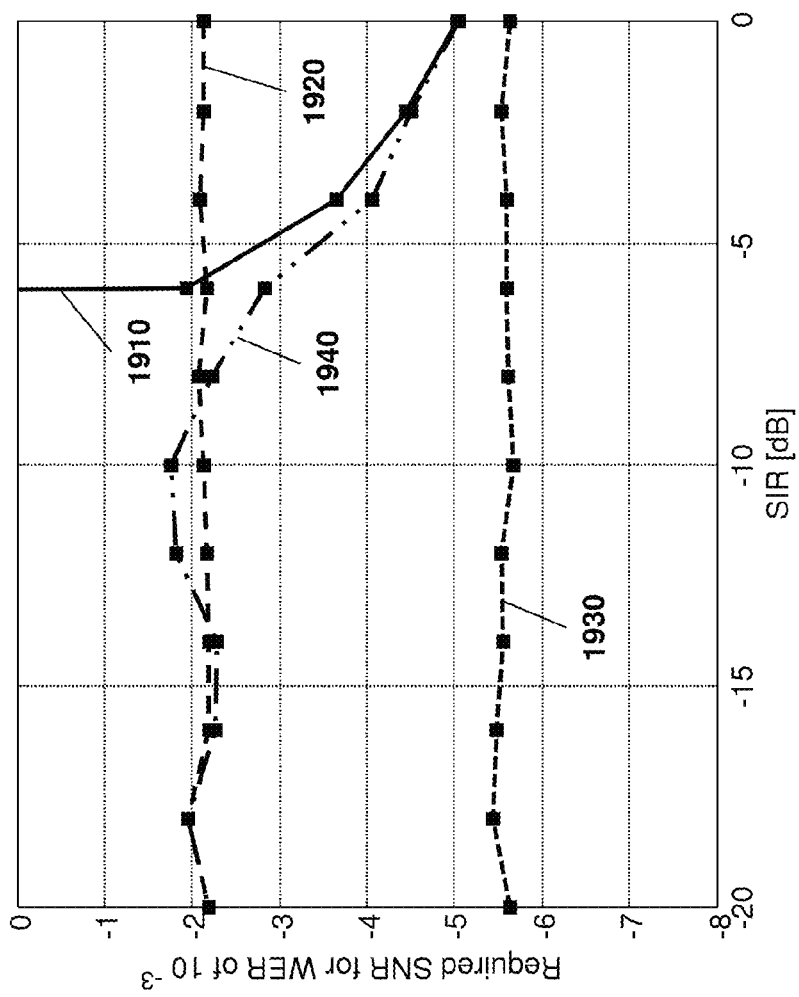
FIG. 19 is a plot showing required SNR for WER versus SIR for a comparative example receiver, a first example receiver, a second example receiver and a third example receiver.

Further, referring to FIG. 19, the figure shows the required SNR to meet PCFICH WER targets of $10^{-3}$ as a function of SIR.

In FIG. 19, the comparative example RX receiver is shown by reference numeral 1910, the RX-1 is shown by reference numeral 1920, the second example receiver is shown by reference numeral 1930, and the RX-2 is shown by reference numeral 1940.

As seen from FIGS. 18 and 19, the performance of the RX-2 approaches the performance of a second example receiver when the SIR is higher.

Based on FIGS. 18 and 19, a receiver at a UE may detect PCFICH reliability in the presence of dominant CRS interference. However, the sophisticated receiver involves calculating the reliability metric, which may be complex and result in battery drain at the UE. Further, even with a sophisticated receiver the PCFICH detection performance is reduced by about 3 dB at the cell edge, which corresponds to an SIR of approximately less than −8 dB.

In order to overcome the above, if the pico cell indicates the sub-frames which are currently transmitted with the ABS sub-frames from the aggressor cells to the UEs, the UE can select an appropriate receiver to decode PCFICH.

Further, the serving pico cell may be able to increase the PCFICH coding gain over sub-frames transmitted concurrent to ABS sub-frame transmission from the surrounding macro cells.

Also, the serving pico cell may allocate more power to the resource elements without macro CRS interference and less power or zero power to resource elements with high interference when an appropriate receiver algorithm is assumed.

ABS Sub-Frame Indication

One way to indicate sub-frames that are concurrent with the aggressor cell's ABS sub-frame to a UE is by setting the spare bits available in the MIB. There are ten spare bits available in the MIB every ten milliseconds. These bits can be set to 0 to indicate normal sub-frame or 1 to indicate sub-frames concurrent with the ABS sub-frame transmission. When the UE sees that a particular sub-frame corresponds to an ABS sub-frame transmission from the aggressor cell, the RX-2 receiver is used to detect PCFICH for that sub-frame. Otherwise, the comparative example receiver is used to detect the PCFICH.

Once the UE reads the MIB in the first 40 milliseconds (first four radio frames), the UE does not need to read the MIB again unless there is a change in ABS pattern. If there is an ABS pattern change, the pico cell may send system information (SI) change updates to all the UEs.

Figure 20:
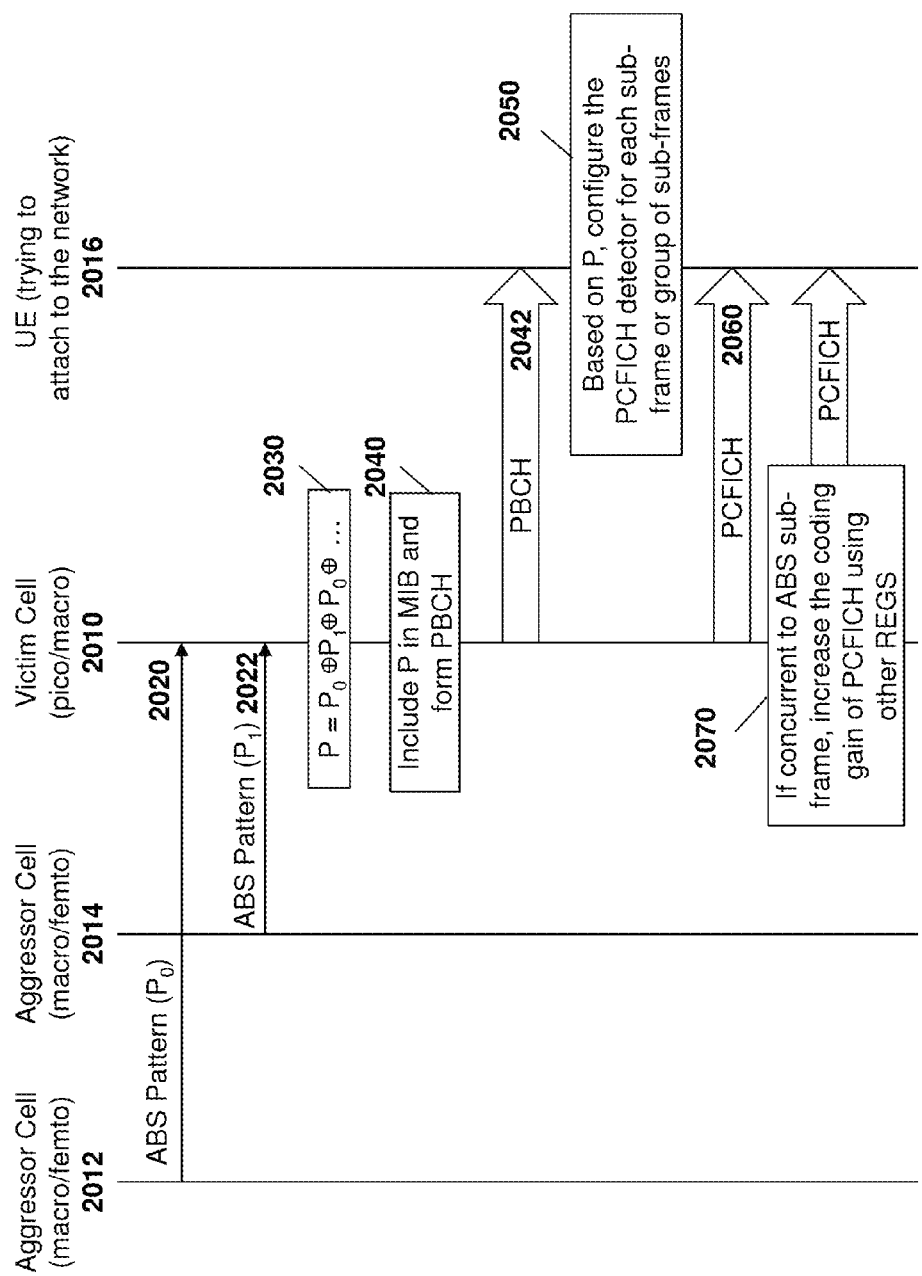
FIG. 20 is a flow diagram showing signaling of an ABS pattern to a victim cell and communication from the victim cell.

Reference is now made to FIG. 20. In FIG. 20, the victim cell 2010 receives the ABS pattern over an X2 interface from aggressor cells in the vicinity. In the example of FIG. 20, aggressor cells might include a macro or femto cell 2012 and aggressor macro or femto cell 2014. However, the example of FIG. 20 is not meant to be limiting and any number of aggressor or macro cells might be communicating with a victim cell 2010.

Each of aggressor cell 2012 and 2014 sends an ABS pattern to victim cell 2010, as shown by arrows 2020 and 2022.

At victim cell 2010, a logical OR is performed between the various patterns to find a value P. The value P is equal to $\{p_0, p_1, p_2, \ldots, p_{39}\}$. The calculation is as follows:

$$P = P_0 \oplus P_1 \oplus P_2 \ldots \oplus P_{N-1} \quad (10)$$

Where each pattern is logical OR with the rest of the patterns and N represents the number of macro cells.

The composite ABS pattern P is broadcast by the serving victim cell 2010 as part of a master information block, as shown by arrows 2040 and 2042. to a UE 2016.

UE 2016 configures the PCFICH detector for each sub-frame or group of sub-frames based on the P found in the MIB broadcast on the PCFICH as shown by arrow 2050.

Thereafter, when the UE 2016 receives the PCFICH, as shown by arrow 2060, the appropriate receiver can be utilized.

Furthermore, the victim cell 2010 can, if concurrent to the ABS sub-frame, increase the coding gain of the PCFICH using other resource element groups, as shown by arrow 2070, which is then transmitted to the UE 2016 and decoded using the appropriate receiver.

Alternatively, the composite ABS pattern P can be folded into a Jbit ABS pattern as follows:

$$\bar{p}_n = \sum_{i=0}^{L-1} {}_\oplus p_{n+ij} \text{ for } n = 0, 1, \ldots, j-1 \quad (11)$$

Where LJ=40 and $$\sum_i {}_\oplus x_i$$

represents d logical OR summation of $\{x_1\}$. The operation of the above results in a folded composite ABS pattern $\bar{P} = \{\bar{p}_0, \bar{p}_1, \ldots, \bar{p}_{j-1}\}$. The folding operation gives flexibility between the complexity of the PCFICH decoded and the usage of the spare bits available in the MIB. For example, when J is set to "40", the 40 spare bits available in the MIB are used to indicate the composite ABS sub-frame pattern. If J is set to "1", only 1 bit is used to indicate the ABS sub-frame pattern. In the latter case, the 1 bit indicates the presence or absence of the aggressor cells in the vicinity.

As shown in FIG. 20, the serving cell or victim cell may increase the coding gain of the PCFICH if the current sub-frame is transmitted concurrent with the ABS sub-frame transmission from one of the aggressor cells. The coding gain of the PCFICH can be increased by transmitting the CFI value over other REGs of the OFDM symbol number 0.

Legacy UEs would just decode the CFI by decoding the REs or which the PCFICH is transmitted. UEs utilizing the above method may also used PCFICH transmitted over other REGs.

For example, the changes to the MIB message according to one embodiment are shown in Table 9 as:

TABLE 9

MIB with ABS Pattern

-- ASN1START
MasterInformationBlock ::=  SEQUENCE {
  dl-Bandwidth              ENUMERATED {
                                    n6, n15, n25, n50, n75, n100},
  phich-Config               PHICH-Config,
  systemFrameNumber      BIT STRING (SIZE (8)),
  FoldedCompositeABS_Pattern     BIT STRING (SIZE (J)),
  spare                      BIT STRING (SIZE (10-J))
}
-- ASN1STOP As seen from the above, the DL bandwidth is a parameter for the transmission of bandwidth configuration.

The system frame number is also the same and defines the most significant bits if the system frame number.

The FoldedCompositeABS_pattern is a bit pattern indicating the composite ABS sub-frame patterns of the surrounding macro cells. This is set to "all 0" if the surrounding cells do not configure ABS sub-frames. The field is of length J bits where J is less than or equal to 10.

Figure 21:
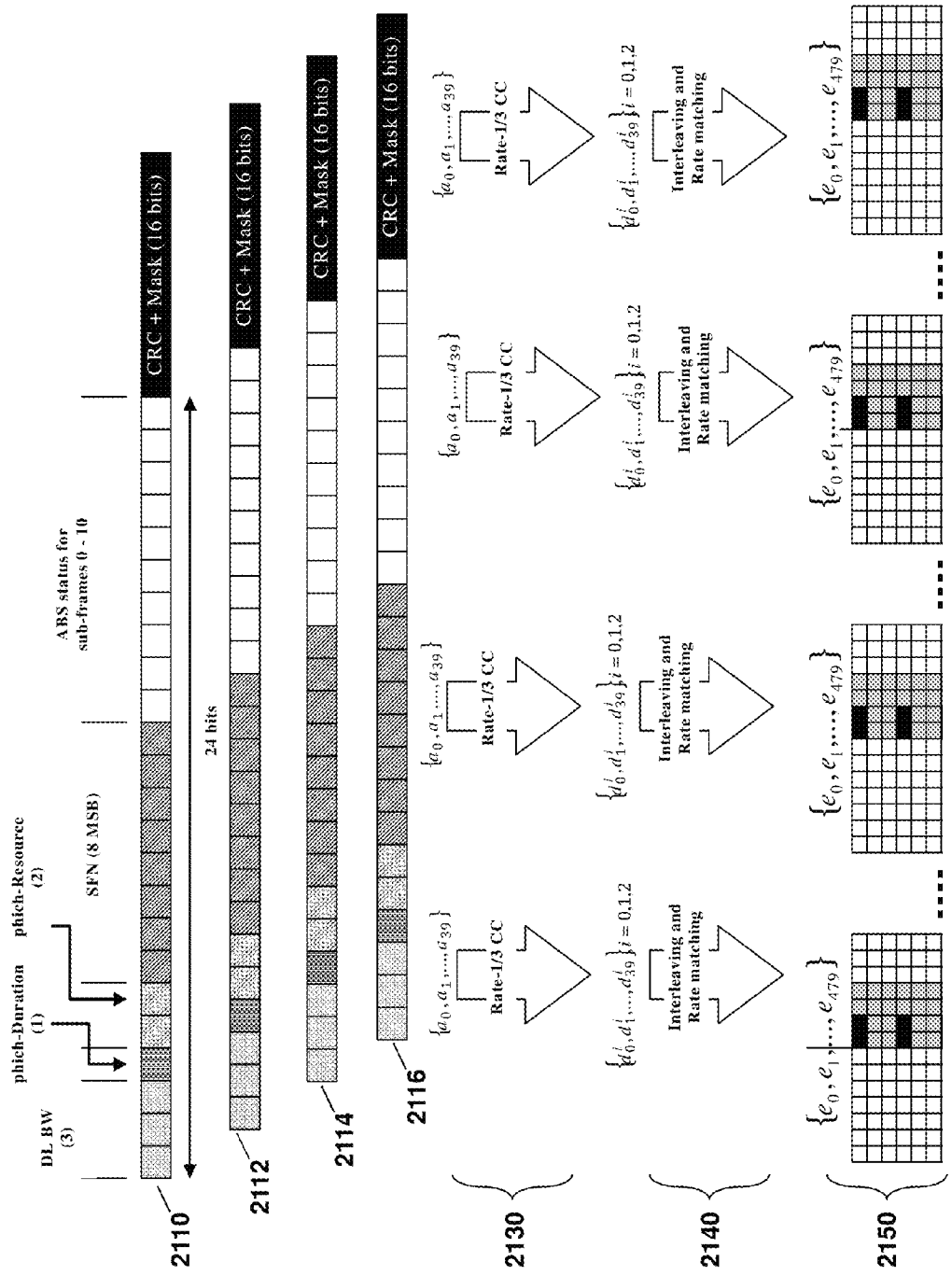
FIG. 21 is a block diagram showing encoding of ABS patterns into four MIB patterns, one MIB pattern for an ABS pattern of one set of radio frames.

Referring to FIG. 21, the Figure shows a modified MIB encoding to include composite ABS patterns. As illustrated, the 40 bit composite ABS pattern can be inserted into the spare bits of the MIB, where the MIB is transmitted across four radio frames (2150). Four different MIB patterns 2110, 2112, 2114 and 2116 can be used to indicate the ABS patterns in radio frame 4i, 4i+1, 4i+2, 4i+3, respectively. As with FIG. 11 above, in the MIB message, the first three bits comprise the downlink bandwidth. The next bit defines the PHICH duration. The next two bits define the PHICH resource. The next eight bits define the eight most significant bits of the system frame number.

The next ten bits are for the ABS status for sub-frames 0 to 10. In MIB pattern 2110, the ABS status is for radio frames 0, 4, 8 etc (i.e., radio frames 4i).

In MIB pattern 2112, the ABS status is for radio frames 1, 5, 9 etc (i.e., radio frames 4i+1).

In MIB pattern 2114 the ABS status is for radio frames 2, 6, 10 etc (i.e., radio frames 4i+2).

Further, in MIB pattern 2116 the ABS status is for radio frames, 3, 7, 11 etc (i.e., radio frames 4i+3).

The MIB patterns are then each convolution coded independently, shown in general by reference numeral 2130 and interleaved, showed by reference numeral 2140. Consequently each MIB is transmitted over four radio frames as shown by reference numeral 2150.

In some cases, the UE may not be able to combine the received information over consecutive radio frames in case the MIB cannot be decoded based on received information over one radio frame. However, the UE can still soft combine the information received over every fourth radio frame to improve detection reliability.

Alternatively, the composite ABS pattern can be folded into a ten bits (or less) ABS pattern as expressed in equation 11 above by setting J to be less than or equal to 10. In this case, the MIB encoding is illustrated with regard to FIG. 22 in which radio frame 2210 has ten bits for the ABS pattern starting of length J starting from the sub-frame 0 of radio frames 0, 4, 8 etc. Convolution coding is then performed as shown by arrow 2212 and interleaving and rate matching is shown by arrow 2214 to produce the frames as shown by reference numeral 2220.

Figure 22:
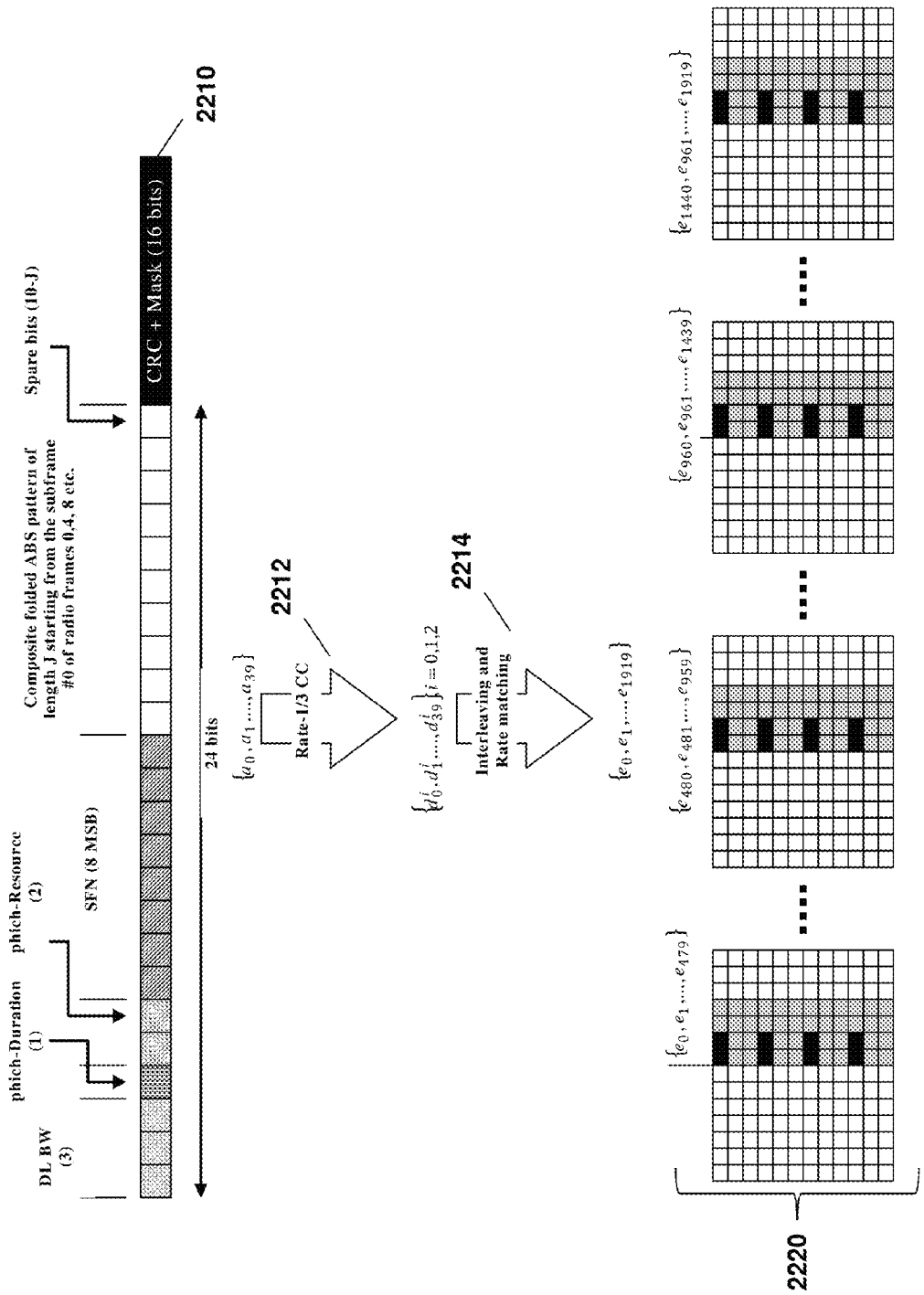
FIG. 22 is a block diagram showing encoding of an ABS pattern into one MIB.

From FIG. 22, the J of the available 10 spare bits are used to indicate the ABS pattern as part of the MIB. The other 10 minus J bits are set to 0 and are spare bits for future use. When is J is set to "1", the new UEs or UEs in which are equipped with the new type of PCFICH receiver as described above that are attached to a cell always use the new receiver to decode the PCFICH if the 15$^{th}$ bit in the MIB is set to 1.

Thus, for the special case of J=1, for example, a pico cell may set the 15$^{th}$ bit of the MIB to 1. This ensures all new UEs trying to attach to the pico cell may decode for the first time. In one embodiment, the UE may already be attached to the EPC but not attached to the eNB. The UE may apply the new PCFICH detection for reliable PCFICH detection. Once the UE attaches to the serving cell, the full ABS sub-frame pattern can be obtained via dedicated message (RRC) or system information broadcast messages (SIBs).

Increase PCFICH Resource

In a third set of embodiments, the power of the PCFICH can be boosted. For example when ABS sub-frames configured by the aggressor cell, the victim cell can increase the transmit power of PCFICH REGs during the concurrent sub-frames.

Alternatively, the resources for PCFICH transmission can be increased to improve the PCFICH reliability. The frequency resources are configured by either higher layer signaling or assigning or granting by the sending PDCCH. However, it may not be possible to increase resources for PCFICH transmission by either of these methods, since PCFICH may be received before the reception of an SIB or RRC signaling message.

CFI Over PHICH REGs

One possible approach is to reuse the PHICH resource. In other words, the CFI value may be transmitted on PHICH resources. The frequency resource for PHICH is fixed based on PHICH duration which is known from the MIB on the PHICH, without PCFICH detection. Therefore, the UE can receive the CFI on the PHICH resource before receiving the SIB or other RRC signaling message.

Some PHICH resources can be used to transmit the CFI value instead of transmitting HARQ-ACK information. In an LTE system, one PHICH resource transmits 1 bit of information (0 or 1). If joint detection of two PHICH is applied, up to four values can be indicated.

If the PHICH resource is used for CFI transmission, the corresponding PHICH resource is not used for the HARQ-ACK transmission. In an LTE system, PHICH resources are derived with the lowest index of the scheduled physical radio bearers (PRBs) for Physical Uplink Shared Channel (PUSCH) transmission and demodulation reference signal (DM_RS) index. Therefore, if the proper DM_RS is selected, the eNB can avoid using the PHICH resource reserved for PHICH transmission without constraint in PUSCH scheduling.

Extra PHICH resources can be reserved by increasing the PHICH groups by configuring larger $N_g$ than necessary to support active UEs. The PHICH resource reserved for PCFICH transmission can be defined in the standards or can be configured via higher layer signaling. However, in the latter case, the solution does not apply to idle mode UEs unless the higher layer signaling is transmitted over the physical broadcast channel.

For legacy UEs, the DM_RS index is selected by the victim cell to avoid PHICH corresponding to the legacy UEs to coincide with the PHICH resources used for CFI transmission.

As seen in Table 6.9-1 of the Third Generation Partnership Project (3GPP), TS 36.211 *"Evolved Universal Terrestrial Radio Access (E-UTRA); Physical channels and modulation"*, v. 10.2.0, Jun. 16, 2011 specification, the contents of which are incorporated herein by reference, there may be a problem for TDD in which there are quite a few DL and special sub-frames where there are 0 PHICH groups. Borrowing PHICH resources for CFI may not be possible in this case. However, in this case for sub-frames where PHICH resources are not available, the UE may need to rely on the PCFICH resource itself or semi-statically assume a value as provided above with regard to secondary signaling.

Two possible alternatives exist to transmit the CFI on the PHICH resource.

In a first alternative, separate CFI coding for PHICH transmission utilizes 2 bit CFI information and is mapped to 2 PHICHs based on a mapping table such as that shown below with regard to Table 10. As seen in Table 10, the CFI bits are mapped to a CFI value and are sent on top of the PHICH as well as on the PCFICH.

TABLE 10

| CFI value mapping | |
|---|---|
| CFI | CFI bits($c_0$, $c_1$), |
| 1 | 00 |
| 2 | 01 |
| 3 | 10 |
| 4(reserved bits) | 11 |

Figure 23:
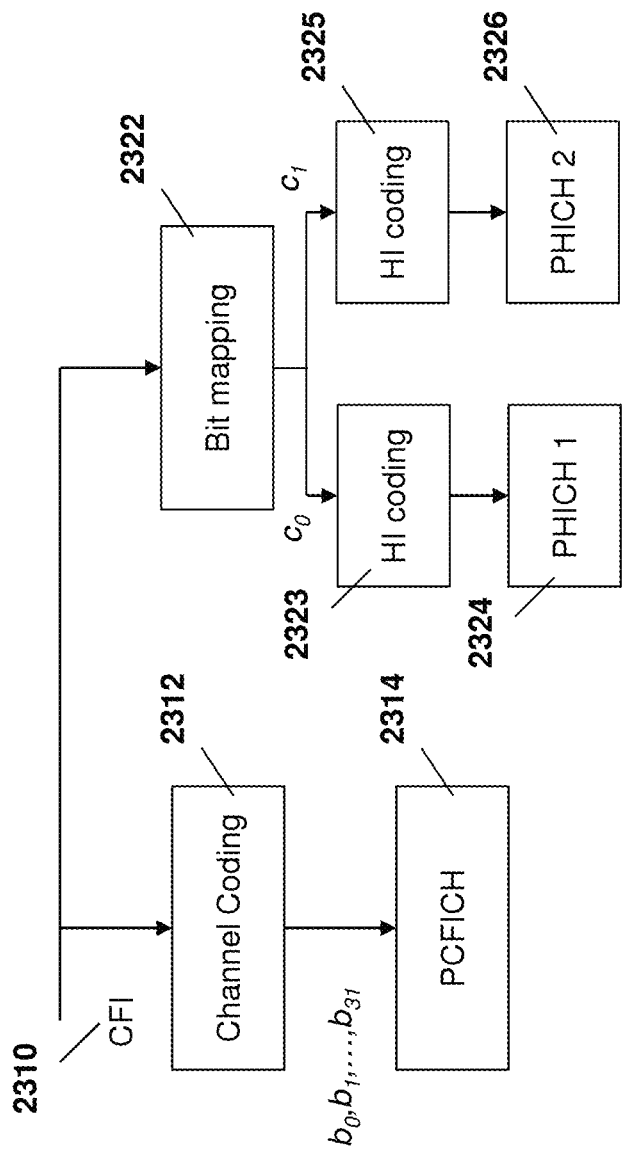
FIG. 23 is a block diagram showing CFI coding onto a PCFICH and PHICH.

Reference is now made to FIG. 23, which shows the CFI value with channel coding sent over the PCFICH. In particular, the CFI value 2310 is provided to channel coding block 2312 which then produces 31 bits. These are sent over the PCFICH, as shown by block 2314.

Similarly, CFI 2310 is provided to bit mapping block 2322, which produces a first bit $C_0$ and a second bit $C_1$. Bit $C_0$ is HI coded at block 2323 and mapped to the first PHICH resource (PHICH 1) at block 2324. Similarly, bit $C_1$ is HI coded at block 2325 and mapped to the second PHICH resource (PHICH 2) at block 2326.

The HARQ indicator word for the first PHICH is set to $\{C_0, C_0, C_0\}$ and the HARQ indicator code word for the second PHICH is set to $\{C_1, C_1, C_1\}$. These indicator bits are multiplied with the orthogonal sequence and subsequently scrambled.

In order to accomplish this, the TS 36.211 standard section 6.9.1 may be changed in accordance with the following text:

The block of bits $b(0), \ldots, b(M_{bit}-1)$ transmitted on one PHICH in one subframe shall be modulated as described in Section 7.1, resulting in a block of complex-valued modulation symbols $z(0), \ldots, z(M_s-1)$, where $M_s = M_{bit}$. When the PHICH resource i is used to transmit PCFICH, the bit $b(i)$ is equal to the corresponding CFI bit value. Table 6.9.1-1 specifies the modulation mappings applicable for the physical hybrid ARQ indicator channel In general, referring to FIG. 23A, the two CFI bits can be coded using rate-2/N code to obtain N coded bits (N≥2). The HARQ indicator word for PHICH resource-i is set to $\{B_i, B_i, B_i\}$ for $i=0, 1, \ldots, N-1$. These indicator bits are multiplied with the orthogonal sequence and subsequently scrambled.

Figure 23A:
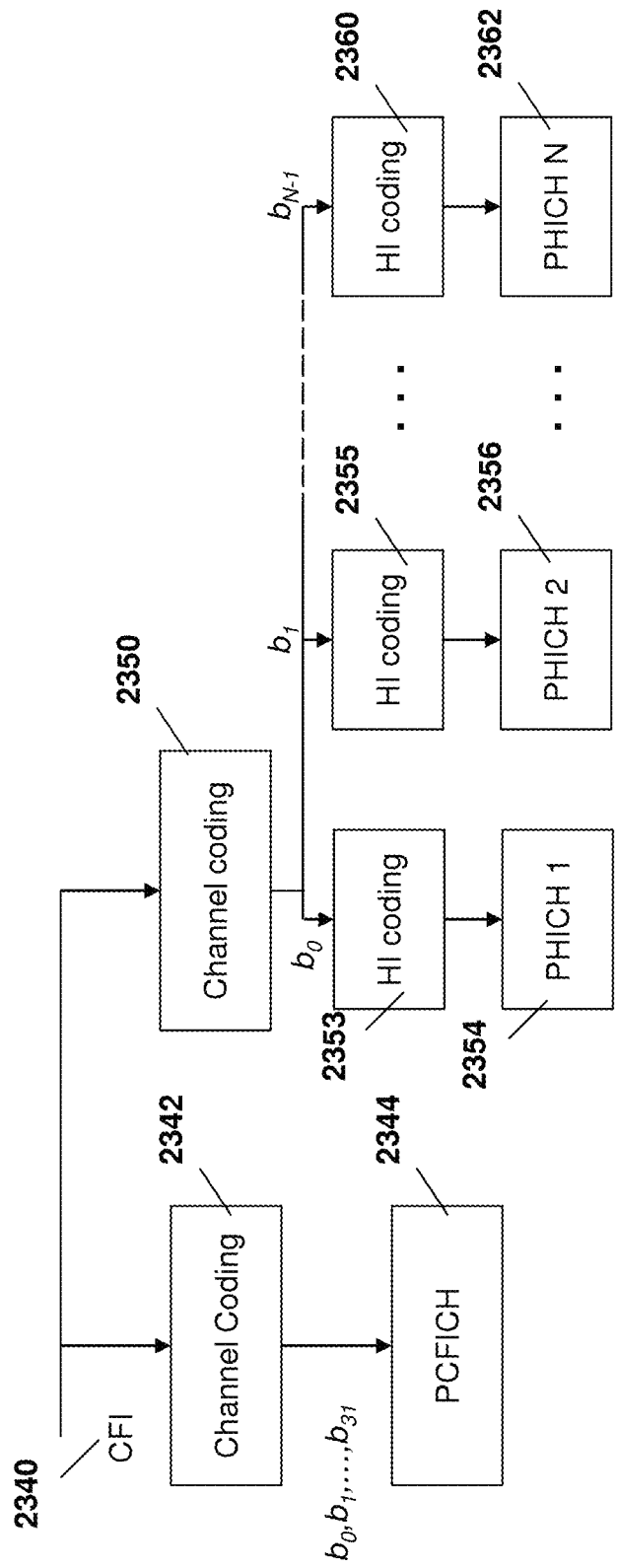
FIG. 23A is a block diagram showing generalized CFI coding onto a PCFICH and PHICH.

Thus, referring to FIG. 23A, the figure shows a generalization of FIG. 23. In particular, CFI 2340 is provided to channel coding blocks 2342 and 2350. The output from channel coding block 2342 is output on PCFICH, as shown by block 2344.

The output from channel coding block 2350 is divided into a plurality of bits. In the example of FIG. 23A, N bits are provided, designated as bits $b_0$ to $b_{N-1}$. Bit $b_0$ is provided to HI coding block 2353 and the output is then mapped to a first PHICH resource (PHICH 1) at block 2354. Similarly, bit $b_1$ is provided to HI coding block 2355 and the output is then mapped to a second PHICH resource (PHICH 2) at block 2356.

The remaining bits are similarly coded and mapped, as shown by bit $b_{N-1}$ being coded at block 2360 and mapped to the Nth PHICH resource at block 2362.

UEs according to some embodiments can detect 2 CFI values by separately decoding the PCFICH received over the PCFICH resources and another CFI value by decoding the CFI value sent over the resource element groups dedicated to the first two PHICH groups. Based on a receiver dependent reliability metric, one of the two decoded CFI values may be used.

Alternatively, one CFI value can be obtained by jointly decoding the information sent over all REGs. However, those skilled in the art with regard to the present disclosure may realize that the first CFI value sent over the PCFICH REGs and the PHICH REGs have different coding gains. Similarly, further performance gains may be obtained by puncturing fully or partially the resource elements which are expected or estimated to be susceptible to CRS interference from aggressor cells.

In a second alternative, joint CFI coding for PHICH transmission maybe utilized where the encoded bits after channel coding are transmitted on a PHICH resource. As shown below with regard to FIG. 24, the encoded bits $B_0$, $B_1, \ldots, B_{31}$ are transmitted using up to 11 PHICHs.

Figure 24:
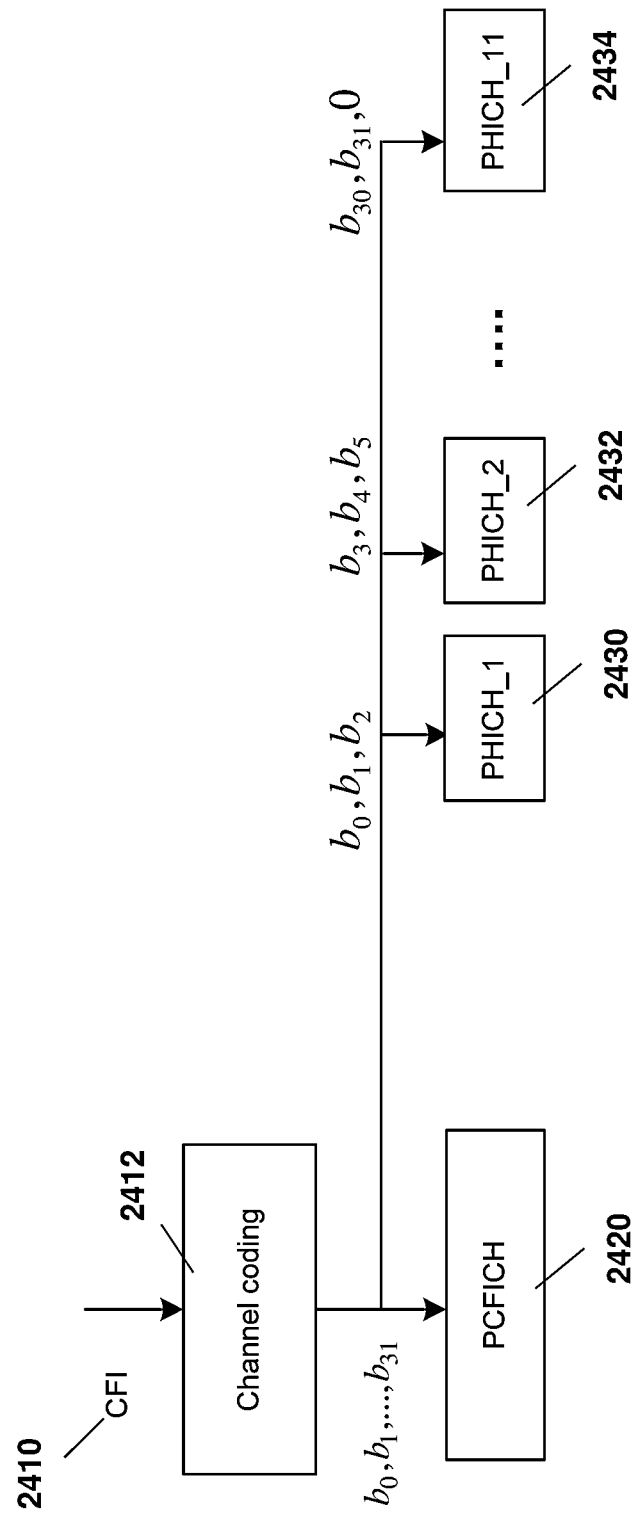
FIG. 24 is a block diagram showing an alternative CFI coding onto a PCFICH and PHICH.

Specifically, referring FIG. 24, the CFI 2410 is sent to channel coding block 2412, which then outputs to both the PCFICH block 2420 and PHICH blocks 1-11 shown by reference numerals 2430, 2432 to 2444 in FIG. 24. The number of PHICHs that are used to send the CFI value can be semi statically configured based on cell planning and deployment. The number of PHICHs for sending a CFI value may be broadcast over the MIB, for example using 2 to 4 spare bits in the MIB.

The HARQ indicator word for the first PHICH is set to $\{B_0, B_1, B_2\}$ and the HARQ indicator code word for the second PHICH is set to $\{B_3, B_4, B_5\}$ and so on. In general, the HARQ indicator word for PHICH resource-i is set to $\{B_{3i}, B_{3i+1}, B_{3i+2}\}$ for $i=0, 1, \ldots, 10$ with $B_{32}$ set to '0'. These indicator bits are multiplied with the orthogonal sequence and subsequently scrambled.

If the second alternative is used, the standards change for the standard 3GPP LTE TS 36.212, may be as follows, as shown in bold in Table 11 below:

TABLE 11

3GPP TS 36.212 Changes

HARQ indicator (HI)
Data arrives to the coding unit in the form of indicators for HARQ acknowledgement for one transport block.
The coding flow is shown in FIG. 5.3.5-1.
Channel coding
The HI is coded according to Table 5.3.5-1, where for a positive acknowledgement HI = 1 and for a negative acknowledgement HI = 0.

Table 5.3.5-1 HI code words.

| HI | HI code word $<b_0, b_1, b_2>$ |
|---|---|
| 0 | $<0, 0, 0>$ |
| 1 | $<1, 1, 1>$ |

If HI is used to transmit a secondary PCFICH, HI is coded according to Table 5.3.5-2, where $\{B_1, \ldots, B_{31}\}$ correspond to the PCFICH code word.

Table 5.3.5-2 HI code words for secondary PCFICH.

| HI code word $<b_0, b_1, b_2>$ |
|---|
| $B_{3i}, B_{3i+1}, B_{3i+2}$ |

Figure 24A:
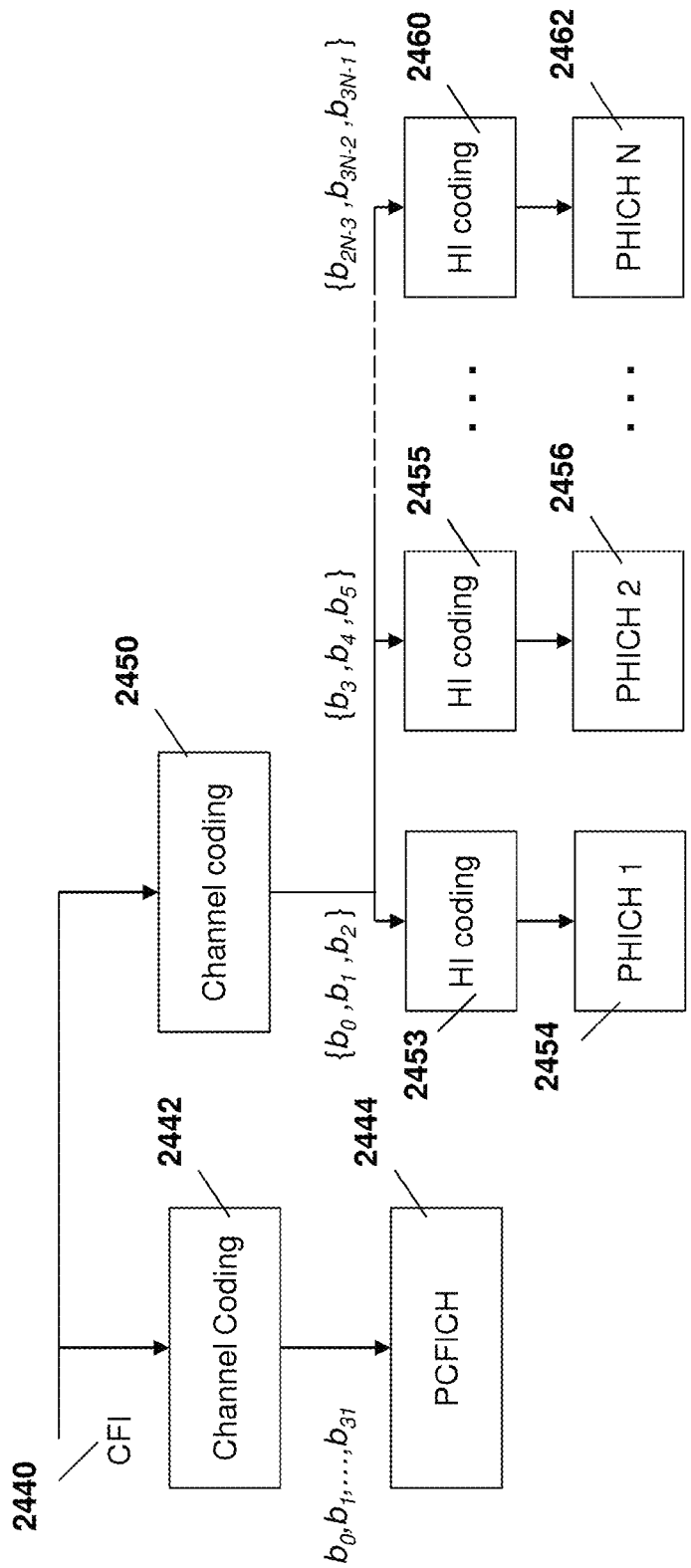
FIG. 24A is a block diagram showing an alternative generalized CFI coding onto a PCFICH and PHICH.

In general referring to FIG. 24A, the two CFI bits can be coded using rate-⅔N code to obtain 3N coded bits. The HARQ indicator word for PHICH resource-i is set to $\{B_{3i}, B_{3i+1}, B_{3i+2}\}$ for $i=0, 1, \ldots, N-1$. These indicator bits are multiplied with the orthogonal sequence and subsequently scrambled.

In all the above embodiments, the number of PHICH resources used to transmit the secondary CFI and the specific PHICH resources may be either signaled via a broadcast message or fixed PHICH resources are specified in the specifications.

In general, the PHICH resources configured for the secondary CFI transmission (including the coding scheme used, for example blocks 2350 and 2450 of FIG. 23A and FIG. 24A respectively) can be indicated in the MIB. A predetermined number of these configurations can be defined in the specifications and the index of this configuration can be included in the MIB. These different configurations may correspond to varying coding gains and/or PHICH resources used to transmit the secondary CFI value. A network node may pick one configuration based on the expected coverage during the deployment.

PCFICH Repetition Using Other REGs

In a further alternative, the serving pico cell may transmit CFI information using more resource elements compared to the default value of 16 resource elements or 4 REGs, whenever the sub-frame is concurrent with an ABS transmission from the surrounding macro cells. As shown above, additional processing gains can be obtained by increasing the resource elements for PCFICH transmission.

One example for performing the repeated transmission is described below. The PCFICH maybe transmitted in the REGs of OFDM symbol number 0 of a sub-frame as specified in 3GPP TS 36.211.

Further, whenever the sub-frame transmission is concurrent to an ABS sub-frame transmission from a surrounding macro cell. The PCFICH REGs may be repeated as follows:

a) identify the order of the of the REGs which are not assigned to the original PCFICH transmission or PHICH transmission; and b) pick the first CCE to transmit PCFICH again on those REGs.

The PDCCH may be mapped according to the procedure described in section 6.8.5 of 3GPP TS 36.211 with the following exception. Since the secondary PCFICH is punctured into the CCE the PDCCH maybe reassigned at another CCE location.

From the above procedure, legacy UEs can still decode the PCFICH if there is no significant CRS interference. New UEs can decode the PCFICH across all eight REGs to extract more processing gain. The legacy UEs may try blind decoding for PDCCH over CCE assigned to PDFICH in additional resources unsuccessfully. The new UEs which are aware of the CRS interference form the aggressor cell for each sub-frame may know the presence of the secondary PCFICH and REGs over which it is transmitted.

Alternatively, a new UE may not be aware of the CRS interference but still be able to detect the PCFICH blindly over the new REGs for both PDCCH and PCFICH.

Further, instead of increasing the amount of resources, PCFICH performance can be improved by transmitting the same CFI value across multiple sub-frames.

In general, the CFI is repeated between sub-frames {pn . . . pn+p−1} to boost the PCFICH reception in sub-frames {pn+1, . . . , pn+p−1} with latter sub-frames getting a higher boost.

In addition to parameter p, a start and an end point of the CFI may be defined in terms of a radio frame index $I_{start}$, $I_{end}$ so that between the first sub-frame of radio frame $I_{start}$ and the last sub-frame of radio frame $I_{end}$, p consecutive sub-frames share the same CFI. All CFI configuration ($I_{start}$, $I_{end}$, p) are informed to the UE by the serving eNB. This can be done via dedicated signaling or broadcast information.

In another example, the CFI is repeated every q sub-frames. In particular, where q=10, the CFI of sub-frame I is repeated every radio frame. The start and end point may be defined in terms of the radio frame index $J_{start}$, $J_{end}$ so that between the first sub-frame radio frame $J_{start}$ and the last sub-frame of radio frame $J_{end}$, every q sub-frames show the same CFI value. The CFI configuration (ie $J_{start}$, $J_{end}$, q) are informed to the UE by the serving eNB via dedicated signaling or broadcasting.

While the legacy UEs cannot benefit from knowledge of CFI repetition, the CFI repetition scheme is backwards compatible and does not affect legacy mobile device operation. On the other, new UEs are aware of this information and they may improve the detection reliability PCFICH by accumulating the CFI transmission across sub-frames.

The above may be implemented by any network element. A simplified network element is shown with regard to FIG. 25.

Figure 25:
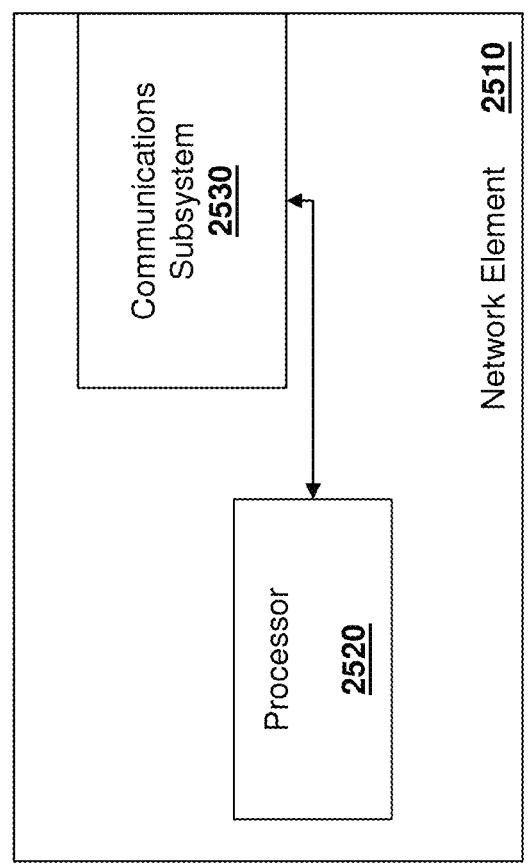
FIG. 25 is a block diagram of a simplified network element.

In FIG. 25, network element 2510 includes a processor 2520 and a communications subsystem 2530, where the processor 2520 and communications subsystem 2530 cooperate to perform the methods described above.

Further, the above may be implemented by any UE. One exemplary device is described below with regard to FIG. 26.

UE 2600 is typically a two-way wireless communication device having voice and data communication capabilities. UE 2600 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 2600 is enabled for two-way communication, it may incorporate a communication subsystem 2611, including both a receiver 2612 and a transmitter 2614, as well as associated components such as one or more antenna elements 2616 and 2618, such as those described above with regards to FIGS. 1 to 3, local oscillators (LOs) 2613, and a processing module such as a digital signal processor (DSP) 2620. As will be apparent to those skilled in the field of communications, the particular design of the communication subsystem 2611 will be dependent upon the communication network in which the device is intended to operate. The radio frequency front end of communication subsystem 2611 can be any of the embodiments described above.

Network access requirements will also vary depending upon the type of network 2619. In some networks network access is associated with a subscriber or user of UE 2600. A UE may require a removable user identity module (RUIM) or a subscriber identity module (SIM) card in order to operate on a CDMA network. The SIM/RUIM interface 2644 is normally similar to a card-slot into which a SIM/RUIM card can be inserted and ejected. The SIM/RUIM card can have memory and hold many key configurations 2651, and other information 2653 such as identification, and subscriber related information.

Figure 26:
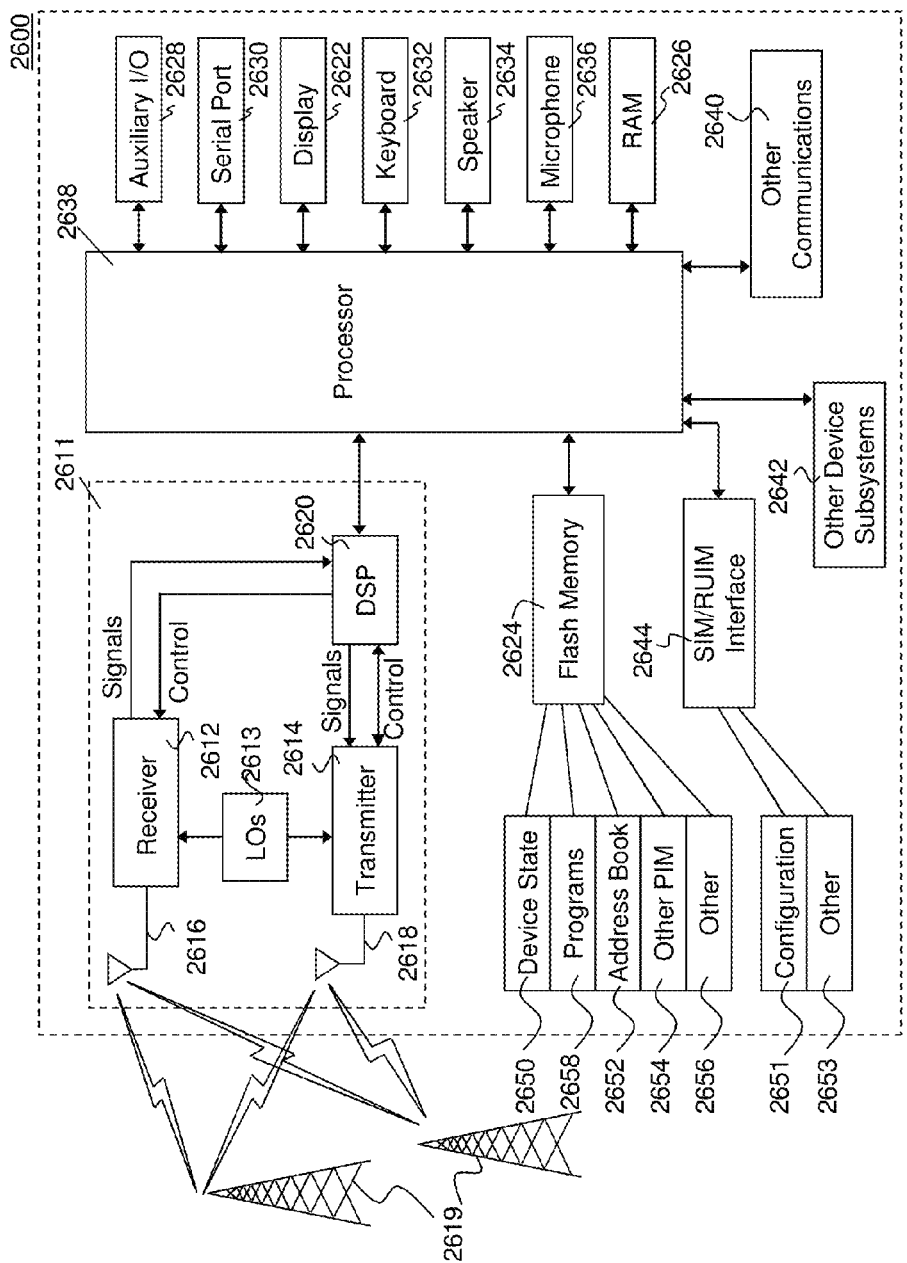
FIG. 26 is a block diagram of an example user equipment.

When required network registration or activation procedures have been completed, UE 2600 may send and receive communication signals over the network 2619. As illustrated in FIG. 26, network 2619 can consist of multiple base stations communicating with the UE.

Signals received by antenna 2616 through communication network 2619 are input to receiver 2612, which may perform such common receiver functions as signal amplification, frequency down conversion, filtering, channel selection and the like. A/D conversion of a received signal allows more complex communication functions such as demodulation and decoding to be performed in the DSP 2620. In a similar manner, signals to be transmitted are processed, including modulation and encoding for example, by DSP 2620 and input to transmitter 2614 for digital to analog conversion, frequency up conversion, filtering, amplification and transmission over the communication network 2619 via antenna 2618. DSP 2620 not only processes communication signals, but also provides for receiver and transmitter control. For example, the gains applied to communication signals in receiver 2612 and transmitter 2614 may be adaptively controlled through automatic gain control algorithms implemented in DSP 2620.

UE 2600 generally includes a processor 2638 which controls the overall operation of the device. Communication functions, including data and voice communications, are performed through communication subsystem 2611. Processor 2638 also interacts with further device subsystems such as the display 2622, flash memory 2624, random access memory (RAM) 2626, auxiliary input/output (I/O) subsystems 2628, serial port 2630, one or more keyboards or keypads 2632, speaker 2634, microphone 2636, other communication subsystem 2640 such as a short-range communications subsystem and any other device subsystems generally designated as 2642. Serial port 2630 could include a USB port or other port known to those in the art.

Some of the subsystems shown in FIG. 26 perform communication-related functions, whereas other subsystems may provide "resident" or on-device functions. Notably, some subsystems, such as keyboard 2632 and display 2622, for example, may be used for both communication-related functions, such as entering a text message for transmission over a communication network, and device-resident functions such as a calculator or task list.

Operating system software used by the processor 2638 may be stored in a persistent store such as flash memory 2624, which may instead be a read-only memory (ROM) or similar storage element (not shown). Those skilled in the art will appreciate that the operating system, specific device applications, or parts thereof, may be temporarily loaded into a volatile memory such as RAM 2626. Received communication signals may also be stored in RAM 2626.

As shown, flash memory 2624 can be segregated into different areas for both computer programs 2658 and program data storage 2650, 2652, 2654 and 2656. These different storage types indicate that each program can allocate a portion of flash memory 2624 for their own data storage requirements. Processor 2638, in addition to its operating system functions, may enable execution of software applications on the UE. A predetermined set of, applications that control basic operations, including at least data and voice communication applications for example, will normally be installed on UE 2600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 2619. Further applications may also be loaded onto the UE 2600 through the network 2619, an auxiliary I/O subsystem 2628, serial port 2630, short-range communications subsystem 2640 or any other suitable subsystem 2642, and installed by a user in the RAM 2626 or a non-volatile store (not shown) for execution by the processor 2638. Such flexibility in application installation increases the functionality of the device and may provide enhanced on-device functions, communication-related functions, or both. For example, secure communication applications may enable electronic commerce functions and other such financial transactions to be performed using the UE 2600.

In a data communication mode, a received signal such as a text message or web page download will be processed by the communication subsystem 2611 and input to the processor 2638, which may further process the received signal for output to the display 2622, or alternatively to an auxiliary I/O device 2628.

A user of UE 2600 may also compose data items such as email messages for example, using the keyboard 2632, which may be a complete alphanumeric keyboard or telephone-type keypad, among others, in conjunction with the display 2622 and possibly an auxiliary I/O device 2628. Such composed items may then be transmitted over a communication network through the communication subsystem 2611.

For voice communications, overall operation of UE 2600 is similar, except that received signals would typically be output to a speaker 2634 and signals for transmission would be generated by a microphone 2636. Alternative voice or audio 110 subsystems, such as a voice message recording subsystem, may also be implemented on UE 2600. Although voice or audio signal output is preferably accomplished primarily through the speaker 2634, display 2622 may also be used to provide an indication of the identity of a calling party, the duration of a voice call, or other voice call related information for example.

Serial port 2630 in FIG. 26 would normally be implemented in a personal digital assistant (PDA)-type UE for which synchronization with a user's desktop computer (not shown) may be desirable, but is an optional device component. Such a port 2630 would enable a user to set preferences through an external device or software application and would extend the capabilities of UE 2600 by providing for information or software downloads to UE 2600 other than through a wireless communication network. The alternate download path may for example be used to load an encryption key onto the device through a direct and thus reliable and trusted connection to thereby enable secure device communication. As will be appreciated by those skilled in the art, serial port 2630 can further be used to connect the UE to a computer to act as a modem.

Other communications subsystems 2640, such as a short-range communications subsystem, is a further optional component which may provide for communication between UE 2600 and different systems or devices, which need not necessarily be similar devices. For example, the subsystem 2640 may include an infrared device and associated circuits and components or a Bluetooth™ communication module to provide for communication with similarly enabled systems and devices. Subsystem 2640 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A user equipment comprising:
a processor; and
a communications subsystem,
wherein the processor and communications subsystem are configured to cooperate to:
receive a control format indicator on a physical control format indicator channel (PCFICH) in a sub-frame;
obtain a control region size indicator from two Physical Hybrid Automatic Repeat Request (HARQ) Indicator Channel (PHICH) resources in the sub-frame, wherein the control region size indicator indicates a control region size of the sub-frame and wherein each PHICH resource contains one bit of information for indicating the control region size, wherein the control region size indicator is obtained by jointly decoding information sent over all PHICH Resource Element Groups; and
determine a control region size of the sub-frame with the control format indicator and the control region size indicator.

2. The user equipment of claim 1, wherein the control region size indicator has been previously channel coded.

3. A method at a user equipment, comprising:
receiving a control format indicator on a physical control format indicator channel (PCFICH) in a sub-frame;
obtaining a control region size indicator from two Physical Hybrid Automatic Repeat Request (HARQ) Indicator Channel (PHICH) resources in the sub-frame, wherein the control region size indicator indicates a control region size of the sub-frame and wherein each PHICH resource contains one bit of information for indicating the control region size, wherein the control region size indicator is obtained by jointly decoding information sent over all PHICH Resource Element Groups; and
determining a control region size of the sub-frame with the control format indicator and the control region size indicator.

4. The method of claim 3, wherein the control region size indicator has been previously channel coded.

5. A non-transitory computer-readable storage medium comprising computer-executable instructions for performing operations on a user equipment, the operations for:
receiving a control format indicator on a physical control format indicator channel (PCFICH) in a sub-frame;
obtaining a control region size indicator from two Physical Hybrid Automatic Repeat Request (HARQ) Indicator Channel (PHICH) resources in the sub-frame, wherein the control region size indicator indicates a control region size of the sub-frame and wherein each PHICH resource contains one bit of information for indicating the control region size wherein the control region size indicator is obtained by jointly decoding information sent over all PHICH Resource Element Groups; and
determining a control region size of the sub-frame with the control format indicator and the control region size indicator.

6. The non-transitory computer-readable storage medium of claim 5, wherein the control region size indicator has been previously channel coded.

* * * * *